United States Patent
Fan et al.

(10) Patent No.: US 10,164,746 B2
(45) Date of Patent: Dec. 25, 2018

(54) TECHNIQUES FOR MANAGING TRANSMISSIONS OF REFERENCE SIGNALS

(71) Applicant: QUALCOMM Incorporated, San Diego, CA (US)

(72) Inventors: Zhifei Fan, San Diego, CA (US); Taesang Yoo, Riverside, CA (US); Jing Sun, San Diego, CA (US); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 171 days.

(21) Appl. No.: 15/153,419

(22) Filed: May 12, 2016

(65) Prior Publication Data

US 2016/0344526 A1    Nov. 24, 2016

Related U.S. Application Data

(60) Provisional application No. 62/165,835, filed on May 22, 2015.

(51) Int. Cl.
*H04J 3/00* (2006.01)
*H04L 5/00* (2006.01)
(Continued)

(52) U.S. Cl.
CPC .......... *H04L 5/0048* (2013.01); *H04L 5/0051* (2013.01); *H04L 5/0091* (2013.01);
(Continued)

(58) Field of Classification Search
CPC ............ H04L 5/0048; H04W 72/0413; H04W 72/0446; H04W 72/14; H04W 72/042
See application file for complete search history.

(56) References Cited

U.S. PATENT DOCUMENTS

| 2011/0058505 A1* | 3/2011 | Pan ........................ H04J 11/005 370/280 |
| 2012/0106471 A1* | 5/2012 | Behravan ................ H04L 5/005 370/329 |

(Continued)

OTHER PUBLICATIONS

Dahlman et al., "Chapter 11—Uplink Physical-Layer Processing," 4G LTE/LTE-Advanced for Mobile Broadband, Mar. 21, 2011, pp. 203-246, XP_055174616A, Elsevier Ltd.
(Continued)

*Primary Examiner* — Clemence S Han
(74) *Attorney, Agent, or Firm* — Holland & Hart LLP/Qualcomm

(57) ABSTRACT

A network may use enhanced sounding reference signal (SRS) transmission techniques to support reference signal transmissions over shared spectrum. For example, a wireless device may receive an uplink grant and an indicator. The uplink grant may include an uplink resource allocation to the wireless device and the indicator may alert the device of a forthcoming reference signal transmission. The wireless device may use the uplink grant and the indicator to determine a reference signal transmission period relative to the resources assigned in the uplink grant. For example, the wireless device may determine that the reference signal transmission period is prior to, during, or subsequent to the uplink transmission period. In some cases, a wireless device may be aperiodically or periodically scheduled for reference signal transmissions.

30 Claims, 24 Drawing Sheets

(51) Int. Cl.
*H04W 72/04* (2009.01)
*H04W 72/14* (2009.01)

(52) U.S. Cl.
CPC ..... *H04W 72/042* (2013.01); *H04W 72/0413* (2013.01); *H04W 72/0446* (2013.01); *H04W 72/14* (2013.01)

(56) References Cited

U.S. PATENT DOCUMENTS

| | | | |
|---|---|---|---|
| 2012/0127932 A1* | 5/2012 | Gao | H04L 5/0035 370/329 |
| 2012/0257584 A1 | 10/2012 | Behravan et al. | |
| 2015/0036601 A1* | 2/2015 | Kim | H04L 5/0048 370/329 |
| 2017/0104566 A1* | 4/2017 | Behravan | H04L 5/0048 |
| 2017/0150499 A1* | 5/2017 | Kim | H04W 72/0446 |
| 2017/0230986 A1* | 8/2017 | Moon | H04W 74/08 |
| 2017/0347322 A1* | 11/2017 | Lee | H04L 5/0048 |
| 2017/0347345 A1* | 11/2017 | Hu | H04W 72/042 |

OTHER PUBLICATIONS

ISA/EP, International Search Report and Written Opinion of the International Searching Authority, Int'l. App. No. PCT/US2016/032527, dated Jul. 28, 2016, European Patent Office, Rijswijk, NL, 14 pgs.

LG Electronics, "DL/UL Solutions of LAA with LBT," 3GPP TSG RAN WG1 Meeting #80, R1-150214, Athens, Greece, Feb. 9-13, 2015, 10 pgs., XP_50933428A, 3rd Generation Partnership Project.

Nokia Networks, "On the PHY Options for LAA UL Operation," 3GPP TSG-RAN WG1 Meeting #80bis, R1-151841, Belgrade, Serbia, Apr. 20-24, 2015, 5 pgs., 3rd Generation Partnership Project.

Qualcomm Incorporated, "Adaptive Frame Structure and DL-UL Configuration for LAA," 3GPP TSG RAN WG1 #81, R1-152783, Fukuoka, Japan, May 25-29, 2015, 5 pgs., 3rd Generation Partnership Project.

Samsung, "Discussion on UL Transmission for LAA," 3GPP TSG RAN WG1 Meeting #81, R1-152872, Fukuoka, Japan, May 25-29, 2015, 5 pgs., 3rd Generation Partnership Project.

* cited by examiner

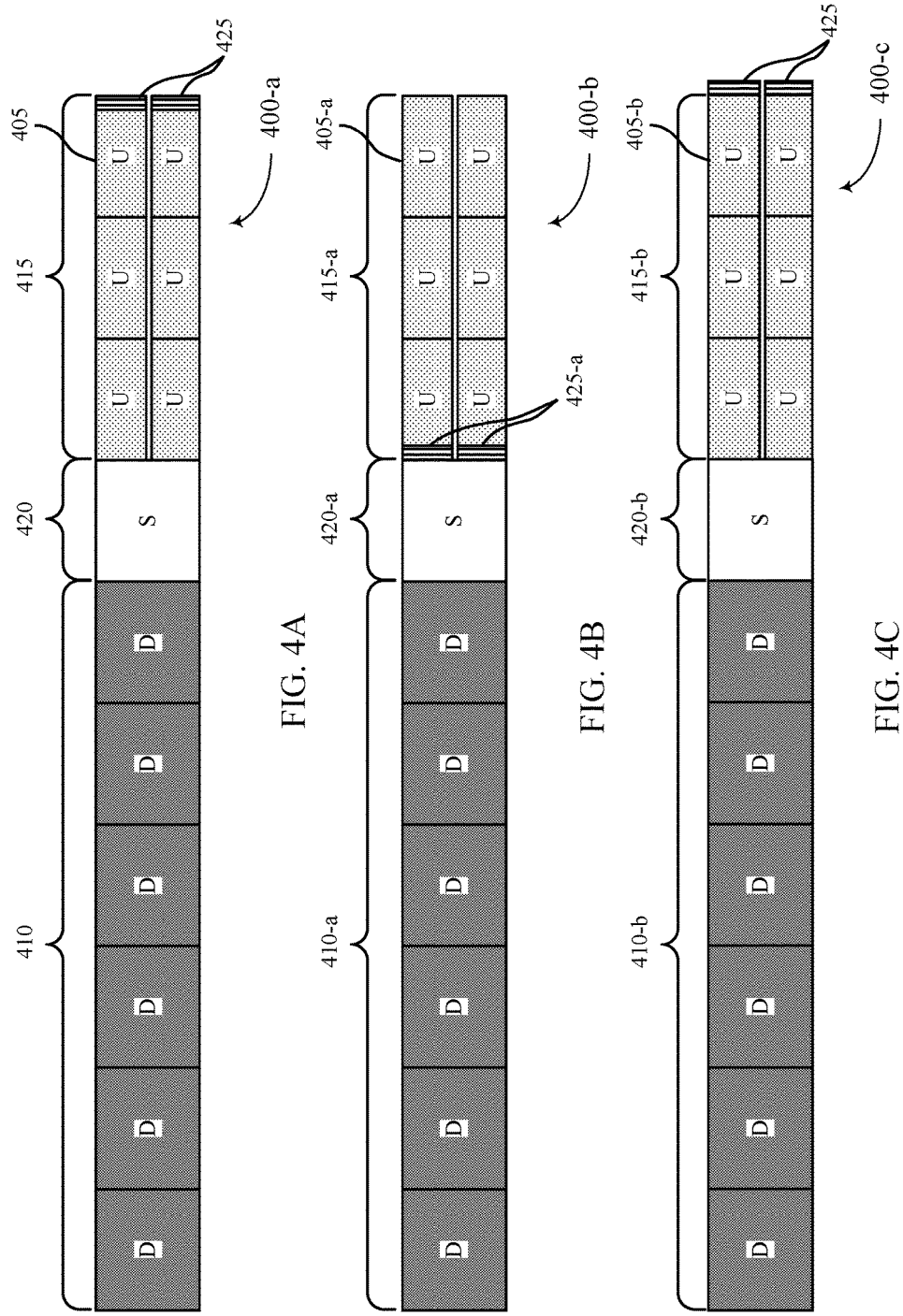

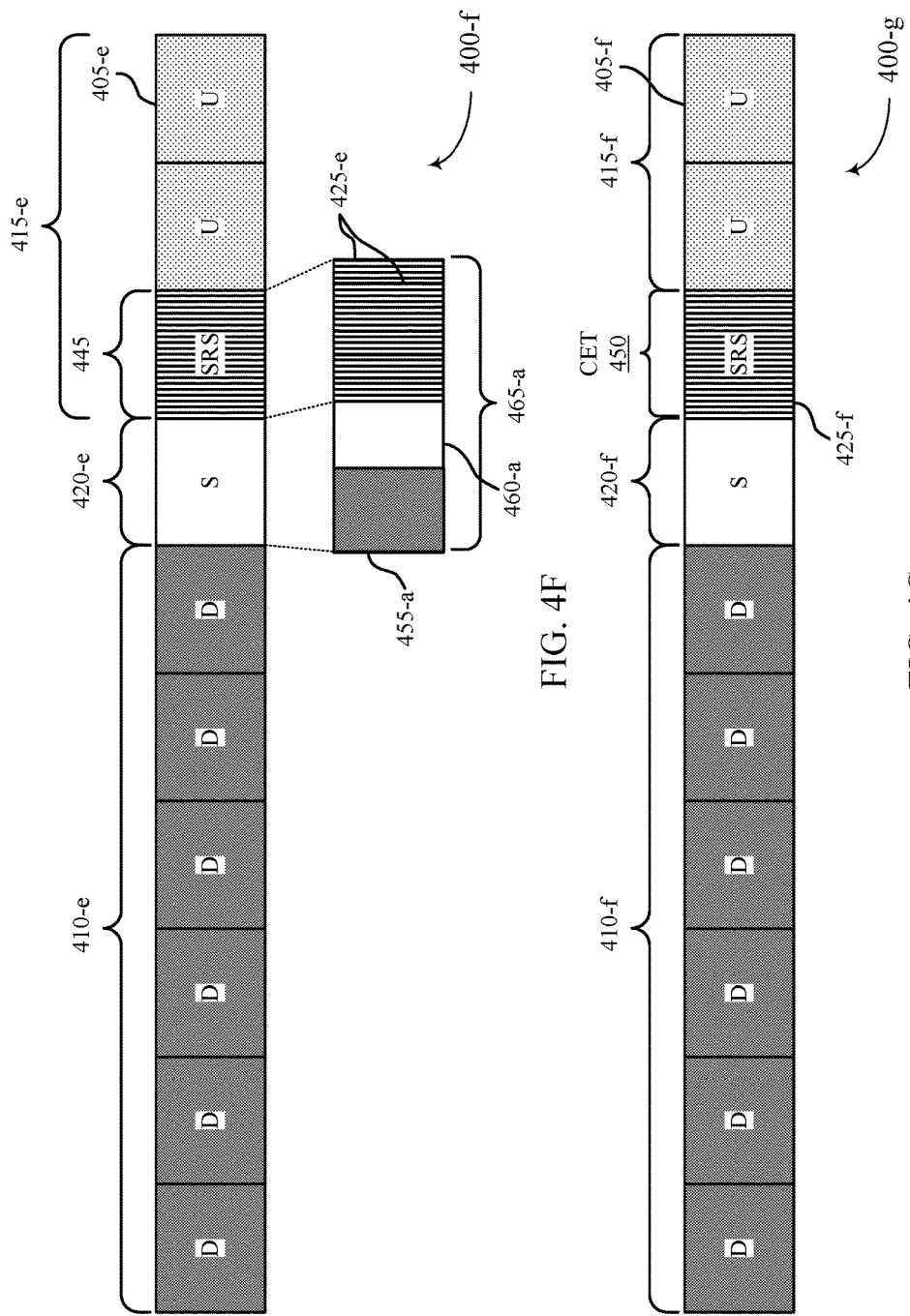

TECHNIQUES FOR MANAGING TRANSMISSIONS OF REFERENCE SIGNALS

CROSS REFERENCES

The present application for patent claims priority to U.S. Provisional Patent Application No. 62/165,835 by Fan et al., entitled "Techniques for Managing Transmissions of Reference Signals," filed May 22, 2015, assigned to the assignee hereof.

BACKGROUND

Field of Disclosure

The following relates generally to wireless communication, and more specifically to techniques for managing sounding reference signal (SRS) transmissions over a shared frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a first wireless multiple-access communication system may operate according to a radio access technology (RAT), such as Long Term Evolution (LTE), and may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). A second wireless multiple-access communications system may operate according to a different RAT, such as Wi-Fi, and may include a number of base stations or access points (APs), each simultaneously supporting communication for multiple mobile devices or stations (STAs). APs may communicate with STAs on downstream and upstream links. In some cases both types of communication systems may operate in the presence of one another and may use shared resources.

In one example, a network using a dedicated radio frequency spectrum band may periodically or aperiodically schedule an SRS transmission to estimate channel quality for bandwidths that are outside the bandwidth assigned to a UE. However, the aperiodic and periodic SRS procedures used by a network for dedicated spectrum transmissions may not support SRS transmissions in a shared network. Therefore, the quality of channel estimates developed by the network using dedicated radio frequency spectrum band may be reduced.

SUMMARY

A network may use enhanced sounding reference signal (SRS) transmission techniques to support reference signal transmissions over shared spectrum. For example, a wireless device may receive an uplink grant and an indicator. The uplink grant may include an uplink resource allocation to the wireless device and the indicator may alert the device of a forthcoming reference signal transmission. The wireless device may use the uplink grant and the indicator to determine a reference signal transmission period relative to the resources assigned in the uplink grant. For example, the wireless device may determine that the reference signal transmission period is prior to, during, or subsequent to the uplink transmission period. The indicator may additionally indicate time and frequency resources for forthcoming reference signal transmissions. In some cases, a wireless device may be aperiodically or periodically scheduled for reference signal transmissions.

A method of wireless communication is described. The method may include identifying an uplink transmission time period associated with a shared radio frequency spectrum band, receiving an indicator in a downlink transmission associated with an uplink transmission of a reference signal, identifying a reference signal time period relative to the uplink transmission time period, and transmitting the reference signal over the shared radio frequency spectrum band during the identified reference signal time period.

An apparatus for wireless communication is described. The apparatus may include means for identifying an uplink transmission time period associated with a shared radio frequency spectrum band, means for receiving an indicator in a downlink transmission associated with an uplink transmission of a reference signal, means for identifying a reference signal time period relative to the uplink transmission time period, and means for transmitting the reference signal over the shared radio frequency spectrum band during the identified reference signal time period.

A further apparatus for wireless communication is described. The apparatus may include a processor, memory in electronic communication with the processor, and instructions stored in the memory and operable, when executed by the processor, to cause the apparatus to identify an uplink transmission time period associated with a shared radio frequency spectrum band, receive an indicator in a downlink transmission associated with an uplink transmission of a reference signal, identify a reference signal time period relative to the uplink transmission time period, and transmit the reference signal over the shared radio frequency spectrum band during the identified reference signal time period.

A non-transitory computer-readable medium storing code for wireless communication is described. The code may include instructions executable to identify an uplink transmission time period associated with a shared radio frequency spectrum band, receive an indicator in a downlink transmission associated with an uplink transmission of a reference signal, identify a reference signal time period relative to the uplink transmission time period, and transmit the reference signal over the shared radio frequency spectrum band during the identified reference signal time period.

Some examples of the method, apparatuses, or non-transitory computer-readable medium described herein may further include processes, features, means, or instructions for determining the reference signal time period to be at a conclusion of the uplink transmission time period. Additionally or alternatively, some examples may include processes, features, means, or instructions for determining the reference signal time period to be during a last symbol of an assigned physical uplink shared channel (PUSCH) or last one or two symbols of a physical uplink control channel (PUCCH).

Some examples of the method, apparatuses, or non-transitory computer-readable medium described herein may further include processes, features, means, or instructions for determining the reference signal time period to be at a beginning of the uplink transmission time period. Additionally or alternatively, some examples may include processes, features, means, or instructions for transmitting reference signal as a demodulation reference signal (DMRS) based preamble.

Some examples of the method, apparatuses, or non-transitory computer-readable medium described herein may further include processes, features, means, or instructions for determining the reference signal time period to be subsequent to a conclusion of the uplink transmission time period, the reference signal time period comprising at least one symbol. Additionally or alternatively, some examples may include processes, features, means, or instructions for determining the reference signal time period to be prior to a beginning of the uplink transmission time period.

Some examples of the method, apparatuses, or non-transitory computer-readable medium described herein may further include processes, features, means, or instructions for transmitting the reference signal as a channel usage beacon signal (CUBS) preamble. Additionally or alternatively, in some examples the reference signal time period is during a special subframe and comprises at least one symbol.

Some examples of the method, apparatuses, or non-transitory computer-readable medium described herein may further include processes, features, means, or instructions for receiving the indicator in a special physical downlink control channel (PDCCH), the special PDCCH indicating a plurality of frequency sub-bands for transmitting the reference signal. Additionally or alternatively, some examples may include processes, features, means, or instructions for receiving the indicator in a special PDCCH, the special PDCCH indicating to an unscheduled wireless device to transmit the reference signal, wherein the wireless device is not scheduled to transmit during the uplink transmission time period.

In some examples of the method, apparatuses, or non-transitory computer-readable medium described herein, the reference signal time period corresponds to a first uplink subframe associated with the uplink transmission time period. Additionally or alternatively, in some examples identifying the uplink transmission time period comprises identifying, by a wireless device, the uplink transmission time period is not scheduled for the wireless device, and determining the reference signal time period to be during a portion of a special subframe based at least in part on the uplink transmission time period not being scheduled for the wireless device.

In some examples of the method, apparatuses, or non-transitory computer-readable medium described herein, the reference signal time period comprises the uplink transmission time period. Additionally or alternatively, in some examples the reference signal time period comprises a CCA exempt transmission time period.

In some examples of the method, apparatuses, or non-transitory computer-readable medium described herein, the CCA exempt transmission time period comprises at least a portion of an uplink subframe and is periodically scheduled. Additionally or alternatively, in some examples the indicator comprises a periodicity, or an offset, or a frequency hopping pattern.

In some examples of the method, apparatuses, or non-transitory computer-readable medium described herein, the reference signal time period comprises a portion of a special subframe. Additionally or alternatively, in some examples a special SRS frame comprises the reference signal time period.

In some examples of the method, apparatuses, or non-transitory computer-readable medium described herein, the indicator comprises a special SRS frame number associated with the special SRS frame. Additionally or alternatively, in some examples the identifying the reference signal time period is based at least in part on the special SRS frame number, or the periodicity, or the offset, or the frequency hopping pattern.

In some examples of the method, apparatuses, or non-transitory computer-readable medium described herein, the reference signal time period is scheduled periodically or aperiodically. Additionally or alternatively, some examples may include processes, features, means, or instructions for identifying frequency and time resources to transmit the reference signal during the reference signal time period based at least in part on the received indicator.

In some examples of the method, apparatuses, or non-transitory computer-readable medium described herein, the uplink transmission time period comprises at least one uplink subframe. Additionally or alternatively, in some examples the indicator is received over one of a PDCCH or a PFFICH.

In some examples of the method, apparatuses, or non-transitory computer-readable medium described herein, the PDCCH comprises an uplink grant or a downlink grant that comprises the indicator. Additionally or alternatively, in some examples the indicator is indicated by setting a bit in the PFFICH.

In some examples of the method, apparatuses, or non-transitory computer-readable medium described herein, the indicator is a radio resource control (RRC) message. Additionally or alternatively, in some examples the identifying the uplink transmission time period is based at least in part on a received time division duplex (TDD) configuration, wherein the received TDD configuration indicates subsequent uplink, downlink, and special subframes.

A method of wireless communication is described. The method may include identifying a set of wireless devices that are scheduled to transmit reference signals, determining a reference signal time period for transmitting the reference signals in relation to the uplink transmission time period, and transmitting an indication to the set of wireless devices associated with the determined reference signal time period.

An apparatus for wireless communication is described. The apparatus may include means for identifying a set of wireless devices that are scheduled to transmit reference signals, means for determining a reference signal time period for transmitting the reference signals in relation to the uplink transmission time period, and means for transmitting an indication to the set of wireless devices associated with the determined reference signal time period.

A further apparatus for wireless communication is described. The apparatus may include a processor, memory in electronic communication with the processor, and instructions stored in the memory and operable, when executed by the processor, to cause the apparatus to identify a set of wireless devices that are scheduled to transmit reference signals, determine a reference signal time period for transmitting the reference signals in relation to the uplink transmission time period, and transmit an indication to the set of wireless devices associated with the determined reference signal time period.

A non-transitory computer-readable medium storing code for wireless communication is described. The code may include instructions executable to identify a set of wireless devices that are scheduled to transmit reference signals, determine a reference signal time period for transmitting the reference signals in relation to the uplink transmission time period, and transmit an indication to the set of wireless devices associated with the determined reference signal time period.

Some examples of the methods, apparatuses, or non-transitory computer-readable media described herein may further include processes, features, means, or instructions for transmitting reference signals over shared spectrum. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A-4G illustrate examples of sounding reference signal (SRS) transmission schemes for the transmission of reference signals over shared spectrum in accordance with various aspects of the present disclosure;

DETAILED DESCRIPTION

According to the present disclosure, a network may use enhanced sounding reference signal (SRS) transmission techniques to support reference signal transmissions over a shared radio frequency spectrum band. Aspects of the disclosure are described in the context of a wireless communication system. For example, aperiodic and periodic SRS reporting may not support SRS transmissions over a shared channel or using an enhanced component carrier (eCC). Therefore, a network may utilize enhanced SRS reporting procedures. For instance, a base station may transmit an indicator to a user equipment (UE), which the UE may use to identify an SRS transmission period that uses the shared spectrum. In some cases, the UE may use the indicator to determine that the SRS transmission period is prior to, during, or subsequent to an uplink transmission time period that has been scheduled for the shared spectrum. In other cases, the UE may determine that clear channel assessment (CCA) exempt (CET) resources may be used for SRS transmissions based on the indicator. In yet another case, the UE may determine that a special SRS subframe may be used for SRS transmissions based on the indicator. The indicator may also configure the UE to perform SRS transmissions periodically or aperiodically. For periodic transmissions the indicator may include periodicity, offset, and frequency hopping parameters in addition to indicating frame numbers or special SRS frame numbers to the UE.

In some examples, the indicator may configure a UE to transmit aperiodic transmissions prior to a scheduled uplink transmission time period during a special subframe. The indicator may additionally instruct the UE to transmit using allocated time and frequency resources. The UE may perform listen before talk (LBT) procedures, such as performing a CCA and transmitting a wideband channel usage beacon signal (W-CUBS) prior to transmitting an SRS over the shared channel. These and other aspects of the disclosure are further illustrated by and described with reference to apparatus diagrams, system diagrams, and flowcharts.

Figure 1:
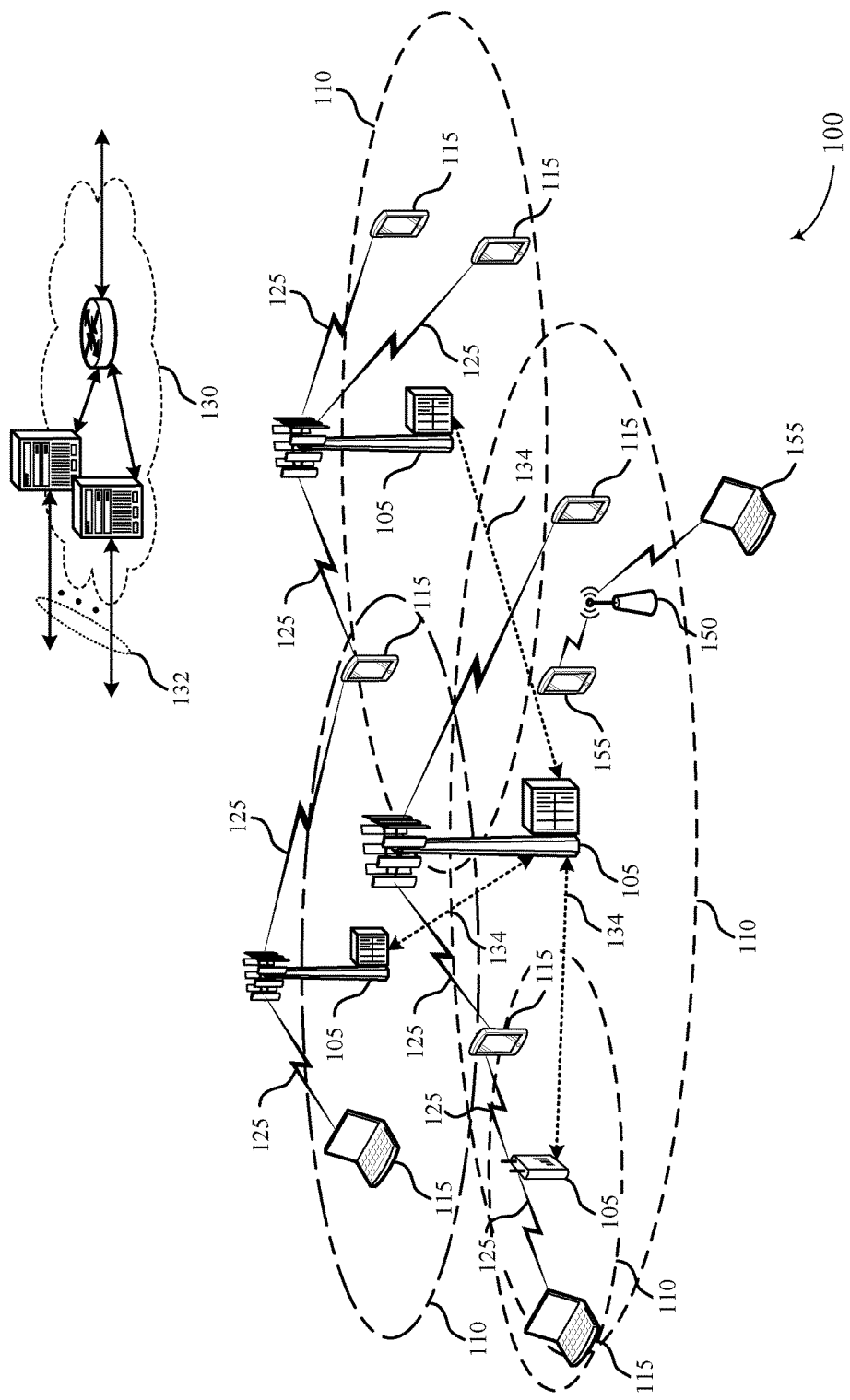
FIG. 1 illustrates an example of a wireless communications system that supports the transmission of reference signals over shared spectrum in accordance with various aspects of the present disclosure.

FIG. 1 illustrates an example of a wireless communications system 100 that supports the transmission of reference signals over shared spectrum in accordance with various aspects of the present disclosure. The wireless communications system 100 includes base stations 105, UEs 115, APs 150, STAs 155, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may support and utilize sounding reference signals for communications over a shared spectrum. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may also utilize sounding reference signals to communicate with base stations 105 over shared spectrum.

A UE 115 may be configured with multiple carriers in carrier aggregation (CA) configuration, and the communication links 125 may represent such multicarrier CA configurations. A carrier may also be referred to as a component carrier (CC), a layer, a channel, etc. The term "component carrier" may refer to each of the multiple carriers utilized by a UE 115 in CA operation, and may be distinct from other portions of system bandwidth. For instance, a CC may be a relatively narrow-bandwidth carrier susceptible of being utilized independently or in combination with other component carriers. Each CC may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual CC may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. In some cases, a UE 115 may utilize an enhanced CC (eCC) for wideband transmissions. An eCC may similarly be aggregated with other eCCs or with CCs as described above.

A UE 115 may communicate with a single base station 105 utilizing multiple carriers, and may also communicate with multiple base stations 105 simultaneously on different carriers. Each cell of a base station 105 may include an UL CC and a DL CC. The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some examples, the wireless communications system 100 may operate according to a first radio access technology (e.g., a cellular radio access technology, such as an LTE/LTE-A technology), but operate in the presence of one or more networks or nodes operating according to a second radio access technology (e.g., a Wi-Fi technology). By way of example, FIG. 1 shows a network comprised of a Wi-Fi access point (AP) 150 in communication with Wi-Fi stations (STAs) 155. In some examples, a UE 115 or base station 105 may support operation in unlicensed bands used by Wi-Fi. A STA 155 or AP 150 may be Wi-Fi devices that may support LTE but may not be configured for LTE operation in an unlicensed band. In the interest of clarity, devices that support LTE operation in a shared band will be referred to as base stations 105 or UEs 115 and devices that do not will be referred to as APs 150 or STAs 155.

In a Wi-Fi network, an AP 150 may communicate with multiple STAs 155 over a shared radio frequency spectrum. The STAs 155 may use contention procedures that include communicating one or more control frames prior to establishing a communication link, such that confirmation of the communication link via exchange of control frames limits interference experienced by nearby communication devices. One example of such techniques include Request to Send (RTS) and Clear to Send (CTS) messaging, where, for example, a STA 155 looking to communicate with another device (e.g., another STA 155 or AP 150), may first send an RTS frame to that device. Once the recipient device receives the RTS frame, the recipient device may confirm the communication link by sending a CTS frame. After the CTS frame is received by the STA 155, the STA 155 may then begin transmitting data to the recipient device. In this way, RTS/CTS messaging can reduce frame collisions by enabling a device, such as a STA 155 or AP 150, to in essence clear the communication path before transmitting data to an AP 150 or STA 155.

In an LTE network, a base station 105 and a UE 115 may communicate over a dedicated frequency spectrum or over different frequency bands of the radio frequency spectrum (e.g., a dedicated radio frequency band and a shared radio frequency band) of a cellular network. Unlike Wi-Fi, a base station 105 may coordinate uplink and downlink communications between a base station 105 and UEs 115 in an LTE network that uses dedicated spectrum. For instance, a base station 105 may partition and allocate uplink resources to multiple UEs 115 so that each UE 115 may simultaneously transmit uplink data without interference from one another. Accordingly, an LTE network may not employ the contention resolution procedures used in Wi-Fi to prevent collisions between transmissions from multiple UEs 115. With increasing data traffic in cellular networks that use dedicated (e.g., licensed) radio frequency bands, offloading of at least some data traffic to a shared radio frequency spectrum may provide a cellular operator with opportunities for enhanced data transmission capacity. A shared radio frequency spectrum may also provide service in areas where access to a dedicated radio frequency spectrum is unavailable.

In order to utilize the shared frequency band, an LTE network may perform LTE-specific contention based procedures (e.g., LBT) to co-exist with a Wi-Fi network. An LBT procedure may include performing a clear channel assessment (CCA) prior to transmitting over a shared frequency band. During a CCA procedure, a UE 115 or base station 105 may monitor a shared frequency band to determine if the channel is occupied for a certain duration. If the channel remains idle for the duration, the UE 115 or base station 105 may begin transmitting. An extended CCA (eCCA) may also be utilized during which a UE 115 selects a random integer, N, between 4 and 32 and performs N CCA procedures. Then if the channel is clear for N CCA procedures the UE 115 may transmit over the medium. The LTE and wireless local area network (WLAN) devices that detect the transmission may accordingly refrain from attempts to access the medium. In some cases, the UE 115 or base station 105 may transmit an LTE-based preamble (e.g., channel usage beacon signal (CUBS)) after performing a CCA and prior to a data transmission. The preamble may be received and decoded by other LTE devices and detected by Wi-Fi devices. The LTE-based preamble may be used to distinguish LTE transmissions from Wi-Fi transmissions over the shared spectrum. The CUBS and subsequent transmissions may be interlaced and resource indexed to occupy at least 80% of the shared channel. In some examples, an LTE device may bypass LBT procedures using a CCA exempt transmission (CET) during which a device transmits without observing a CCA procedure. A CET transmission may comply with various CET rules, such as a maximum duration or maximum percentage of time or frequency resources that can be used during a CET transmission. In one example, a CET transmission has a maximum duty cycle of 5%.

In some cases, an LTE network may utilize eCCs for transmissions over shared spectrum. An eCC may be aggregated with either a primary CC or primary eCC or may be used for standalone communications over a shared or dedicated channel. An eCC may be characterized by one or more features including: wider bandwidth, shorter symbol duration, shorter transmission time interval (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). An eCC may utilize dynamic time division duplex (TDD) operation (i.e., it may switch from DL to uplink (UL) operation for short bursts according to dynamic conditions). A shorter symbol duration may be associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 µs).

An LTE network may use frequency division duplexing (FDD) or TDD for bi-directional communications. FDD operation may enable simultaneous uplink and downlink transmissions. For instance, FDD may allocate a portion of frequency spectrum resources to downlink communications and another portion of frequency band resources to simultaneous uplink communications, whereas TDD operation may switch, in time, between uplink and downlink transmissions. For instance, TDD may allocate the available frequency spectrum resources to downlink communications for a first duration and then allocate the available frequency spectrum resources to uplink communications for a second duration. In one example, a TDD configuration may allocate a first set of subframes to downlink transmissions and a second set of subframes to uplink transmissions. The TDD configuration may additionally include a special subframe between the downlink and uplink communications to facilitate switching between transmission modes. A special subframe may include downlink pilot time slots (DwPTS), a guard period (GP), and uplink pilot time slots (UpPTS). An eCC may utilize a number of TDD configurations, one example of which is given below.

An LTE network may schedule an SRS transmission to estimate channel quality for bandwidths that are outside the bandwidth assigned to a UE 115. An SRS may be scheduled by the network either periodically or aperiodically. Periodic SRS scheduling may be configured with an RRC message that includes periodicity, offset, and frequency hopping for SRS reporting in designated SRS subframes. Aperiodic SRS triggering may be included in the physical downlink control channel (PDCCH) and may be used to trigger one time SRS transmissions from a UE 115. Aperiodic SRS transmissions may be scheduled in uplink and special subframes (e.g., during UpPTS). However, the aperiodic and periodic SRS procedures used by an LTE network for dedicated spectrum transmissions may not support SRS transmissions in a shared network. For instance, the SRS procedures may be incompatible with LBT procedures and may not support transmissions using eCCs. In one example, LTE-based periodic SRS reporting may fail due to the varying durations associated with a UE 115 attempting to win access to the shared medium. Furthermore, LTE-based aperiodic SRS reporting may fail to maintain continuous transmission standards used to retain control of the shared spectrum. Additionally, in some cases transmissions over the shared spectrum may not include special subframes between downlink and uplink transmissions.

Thus, an LTE network may use enhanced SRS transmission techniques to support SRS transmissions over shared spectrum. For example, a UE 115 may identify an uplink transmission time period (e.g., uplink subframes) associated with a shared frequency band. The UE 115 may then receive an indicator from a base station 105 including information associated with an uplink transmission of a reference signal (e.g., SRS transmission). The UE 115 may use the information received in the indicator to determine a time period for reference signal transmissions that is relative to the identified uplink transmission time period. For example, the UE 115 may use the indicator to determine that the reference signal transmission period is prior to, during, or subsequent to the uplink transmission period. The indicator may additionally indicate time and frequency resources to the UE 115. The UE 115 may then transmit the reference signal during the reference signal transmission time period using the indicated resources.

Figure 2:
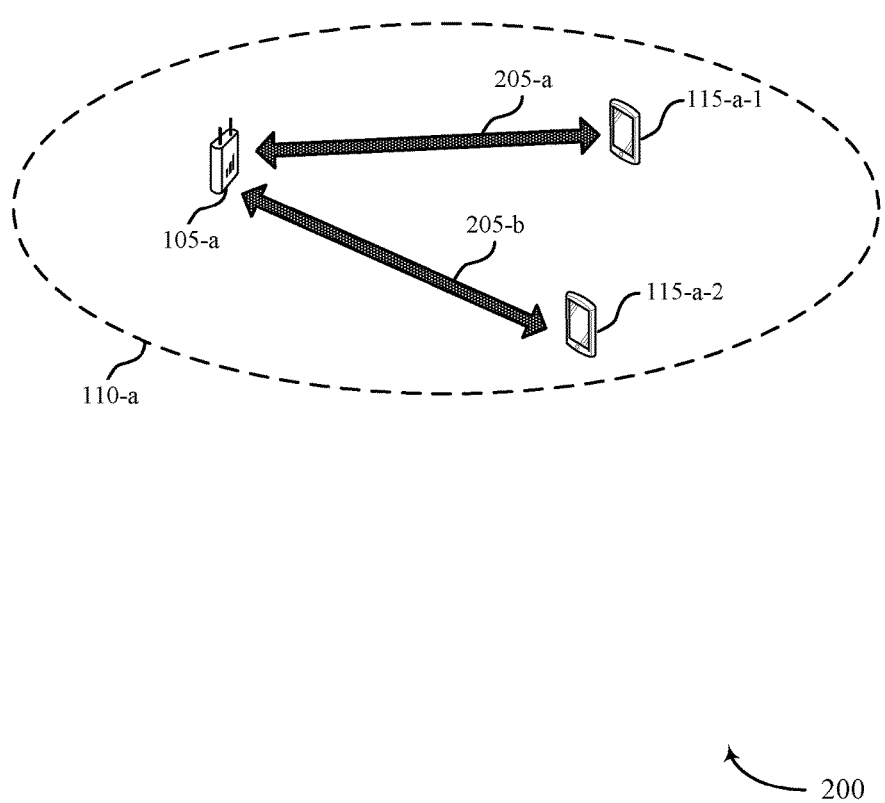
FIG. 2 illustrates an example of a wireless communications subsystem for the transmission of reference signals over shared spectrum in accordance with various aspects of the present disclosure.

FIG. 2 illustrates an example of a wireless communications subsystem 200 for the transmission of reference signals over shared spectrum in accordance with various aspects of the present disclosure. Base station 105-*a*, UE 115-*a*-1, and UE 115-*a*-2 may communicate with one another using dedicated spectrum (e.g., licensed spectrum), the shared spectrum (e.g., unlicensed spectrum), or both via communication links 205. For instance, base station 105-*a* may communicate with UE 115-*a*-1 and UE 115-*a*-2 using shared spectrum via communication links 205-*a* and 205-*b*.

A base station 105 may aperiodically or periodically schedule multiple UEs 115 to transmit reference signals over a shared channel using an eCC. In one example, base station 105-*a* may aperiodically schedule SRS transmissions for UE 115-*a*-2. Base station 105-*a* may perform a successful CCA and begin transmitting over the shared channel. The transmission may include, in the PDCCH, a grant (e.g., downlink or uplink grant) for UE 115-*a*-1 and/or UE 115-*a*-2. The grant may inform UE 115-*a*-1 and UE 115-*a*-2 where to find downlink data, where to transmit uplink data, and may also include an indicator that indicates an SRS transmission time period. The base station 105-*a* may use the indicator to schedule the SRS transmission time period relative to (e.g., prior to, during, or following) uplink resources that are assigned to UE 115-*a*-1 and/or UE 115-*a*-2. In some cases, the SRS transmission time period may be included during and use the assigned uplink resources. The indicator may additionally allocate frequency resources (e.g., wideband or narrowband) to UE 115-*a*-1 and UE 115-*a*-2 for SRS transmissions. For instance, UE 115-*a*-1 and UE 115-*a*-2 may receive the downlink grant and use the indicator to determine where and when to transmit a reference signal. UE 115-*a*-1 and UE 115-*a*-2 may each perform a CCA and may transmit an SRS using time and frequency resources based on the received indicator. In another example, the indicator may direct UE 115-*a*-1 and UE 115-*a*-2 to transmit an SRS using CET resources.

Additionally or alternatively, base station 105-*a* may periodically schedule UE 115-*a*-1 and UE 115-*a*-2 for sounding reference signal transmissions. Similar to the above, base station 105-*a* may perform a CCA and begin transmitting over the shared channel. The transmission may include an indicator (e.g., an RRC message) intended for UE 115-*a*-1 and UE 115-*a*-2. The RRC message may include periodicity, offset, and frequency hopping pattern information and may allocate certain subframes (e.g., a special SRS subframe or a special subframe) for SRS transmissions. The base station 105-*a* may additionally provide UE 115-*a*-1 and UE 115-*a*-2 with an SRS frame number that the UEs 115-*a* and 115-*b* may use to calculate the periodicity and offset.

Figure 3:
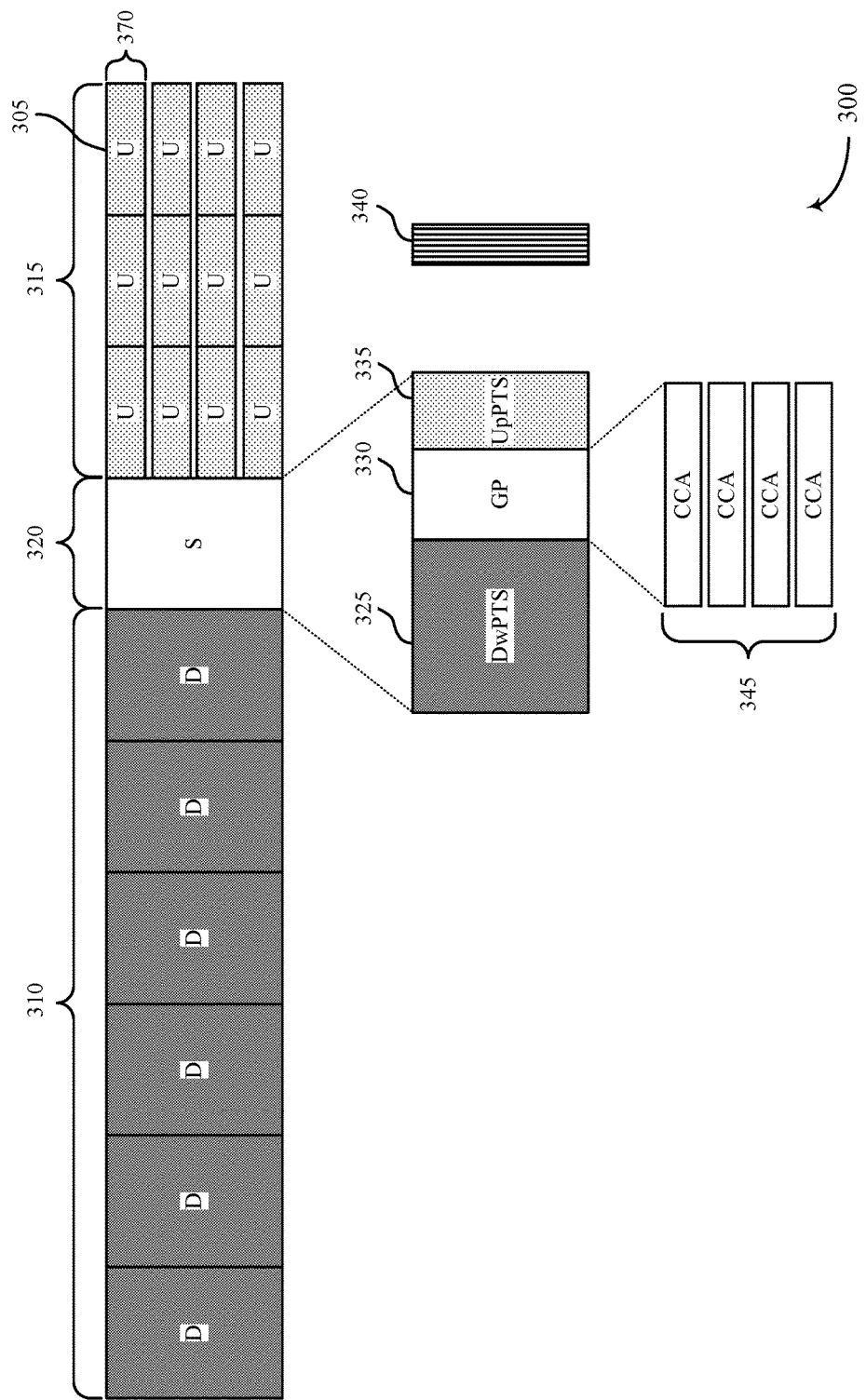
FIG. 3 illustrates an example of a time division duplex (TDD) configuration for the transmission of reference signals over shared spectrum in accordance with various aspects of the present disclosure.

FIG. 3 illustrates an example of a TDD configuration 300 for the transmission of reference signals over shared spectrum in accordance with various aspects of the present disclosure. TDD configuration 300 may illustrate aspects of a transmission between a UE 115 and a base station 105, as described above with reference to FIGS. 1-2. TDD configuration 300 may include subframes 305 that may be designated for downlink transmissions 310, uplink transmissions 315, and/or or special subframes 320 to facilitate switching between uplink and downlink transmission. The uplink transmissions 315 may be divided into subbands 370 that are allocated to certain UEs 115. The UEs 115 may also perform a CCA 345 for a certain subband 370 during the guard period 330 of a special subframe 320. Special subframe 320 may include DwPTS 325, guard period 330, and UpPTS 335. A base station 105 may schedule reference signal transmissions 340 prior to, during, or subsequent to uplink transmissions 315.

In one example, DwPTS 325 may be allocated a number of symbol periods (e.g., 10 symbols) for downlink pilot transmissions and UpPTS 335 may be allocated a number of symbol periods (e.g., 2 symbols) for uplink pilot transmissions. In some cases, the UpPTS may be used for physical random access channel (PRACH) or scheduling request (SR) transmissions. Guard period 330 may be used as a switching time between downlink and uplink transmissions and in some cases may be 3 symbol periods in duration. The number of symbols allocated to any of the DwPTS 325, guard period 330, or the UpPTS 335 may change based on the TDD configuration however. A base station 105 may transmit data using an eCC according to TDD configuration 300. A downlink transmission 310 over an eCC to a UE 115 may utilize a wide bandwidth (e.g., 80 MHz) while the UE 115 may respond using a smaller bandwidth (e.g., 20 MHz) for uplink transmissions 315 over a subband 370. Although in some cases, a UE 115 may respond with a wide bandwidth over an eCC.

For transmissions over a shared channel, the base station 105 may perform a CCA prior to transmitting downlink transmissions 310. The downlink transmissions 310 may include a PDCCH or a physical format frame indicator channel (PFFICH) in addition to a physical downlink shared channel (PDSCH). The PDSCH may include user data while the PDCCH or the PFFICH may include control data for a UE 115. For instance, the PDCCH or the PFFICH may include an indicator for reference signal transmissions 340 as described above with reference to FIG. 2. The base station 105 may determine where the reference signal transmissions 340 will be located relative to uplink transmissions 315 and generate the indicator accordingly. In some cases, a reference signal may extend 1 to 2 symbol periods and reference signal transmissions 340 may extend from 1 symbol period up to a subframe 305 period. The UE 115 may use the received indicator to determine a time period allocated to reference signal transmissions 340 in relation to the uplink transmissions 315 and transmit a reference signal (e.g., an SRS). In some cases, a UE 115 may perform a CCA 345 prior to transmitting over the shared channel. The UE 115 may additionally transmit a CUBS (e.g., a Wi-Fi CUBS (W-CUBS)) after a successful CCA and prior to uplink transmissions to reserve the shared channel. A W-CUBS may be a preamble that is decodable by both LTE and WLAN devices.

FIG. 4A illustrates an example of an SRS transmission scheme 400-*a* for the transmission of reference signals over shared spectrum in accordance with various aspects of the present disclosure. SRS transmission scheme 400-*a* may illustrate aspects of a transmission between a UE 115 and a base station 105, as described above with reference to FIGS. 1-3. SRS transmission scheme 400-*a* may include subframes 405 that may be designated for downlink transmissions 410, uplink transmissions 415, and special subframes 420 to enable switching between uplink and downlink transmission. SRS transmission scheme 400-*a* may additionally include SRS transmissions 425. In some cases, transmissions over the shared spectrum may not include special subframe 420, but may include a transmission gap (e.g., a period where neither downlink nor uplink transmissions are performed by the UE 115 or base station 105) during which a UE 115 may contend for access to the channel.

In the example of FIG. 4A, a base station 105 may identify one or more UEs 115 that are scheduled to transmit an SRS at the end of assigned uplink transmissions 415. The base station 105 may include in downlink transmissions 410 an indicator that aperiodically triggers the identified UEs 115 to perform SRS transmissions 425 at the conclusion of the physical uplink shared channel (PUSCH)/PUCCH) assignment. In some cases, the indicator is included in the PDCCH (e.g., through an uplink or downlink grant), while in other cases the indicator is included in the PFFICH. For instance, the PFFICH may include a bit that may be set to indicate whether or not a UE 115 is schedule to transmit an SRS. In other cases, the indicator is included in a special PDCCH that indicates to the UE 115 a subband for transmitting SRS transmissions 425, which may be different than the subband allocated to the PUCCH or PUSCH for that UE 115.

One or more UEs 115 may receive the indicator and, in some cases, may additionally receive an uplink grant scheduling PUSCH and/or PUCCH transmissions (e.g., in uplink transmissions 415). In some cases, the uplink grant may allocate to UE 115 uplink resources throughout uplink transmissions 415. UE 115 may determine that SRS transmission period 425 is located at the end of the uplink transmissions 415 (e.g., at the end of a PUSCH/PUCCH assignment). The UE 115 may transmit the SRS transmissions 425 during the last symbol of the assigned PUSCH and/or during the last one or two symbols of the assigned PUCCH based on the received indicator and uplink resource assignment. In some cases, the UE 115 may perform a CCA prior to uplink transmissions 415. After a successful CCA, the UE 115 may subsequently transmit data during uplink transmissions 415 and, at the conclusion of the uplink transmissions 415, transmit an SRS during SRS transmissions 425. In some cases, a UE 115 may be assigned PUSCH/PUCCH resource for two of the three uplink subframes 405. In this case, the UE 115 may perform a CCA procedure as above and may transmit an SRS in the last one or two symbols of the assigned PUSCH/PUCCH prior to SRS transmissions 425. For instance, if multiple UEs 115 are scheduled to transmit over the same subband a first UE 115 may be scheduled to transmit during two uplink subframes while a second UE is scheduled to transmit during three uplink subframe. The first UE 115 may then transmit an SRS prior to SRS transmissions 425 (at the conclusion of the second uplink subframe), while the second UE 115 may transmit during SRS transmissions 425.

The SRS may be transmitted as an unprecoded demodulation reference signal (DMRS) waveform and may extend 1 to 2 symbol periods in time. The SRS transmissions 425 may additionally be interleaved and resource indexed to fully occupy the channel (e.g., occupy at least 80% of the channel) and to support multiple SRS transmissions from multiple UEs 115. The SRS transmissions 425 may be interleaved with other uplink transmissions such as the PUSCH, the PUCCH, the PRACH, or SRs. The UEs 115 may rate match around the SRS transmissions 425 that occur during the PUCCH or PUSCH. In some cases, the SRS transmissions 425 may be transmitted using CDM, FDM, and/or time-division multiplexing (TDM) techniques to accommodate additional UEs 115. In some cases, the SRS transmissions 425 transmit during the PUCCH may be transmit at a different power than the control signals.

FIG. 4B illustrates an example of an SRS transmission scheme 400-b for the transmission of reference signals over shared spectrum in accordance with various aspects of the present disclosure. SRS transmission scheme 400-b may illustrate aspects of a transmission between a UE 115 and a base station 105, as described above with reference to FIGS. 1-4A. SRS transmission scheme 400-b may include subframes 405-a that may be designated for downlink transmissions 410-a, uplink transmissions 415-a, and special subframes 420-a to enable switching between uplink and downlink transmission. SRS transmission scheme 400-b may additionally include SRS transmissions 425-a. In some cases, transmissions over the shared spectrum may not include special subframe 420, but may include a gap between downlink transmissions 410 and uplink transmissions 415 during which a UE 115 may contend for access to the channel.

A base station 105 may identify one or more UEs 115 that are scheduled to transmit an SRS at the beginning of assigned uplink transmissions 415-a. The base station 105 may include in downlink transmissions 410-a an indicator that aperiodically triggers the identified UEs 115 to perform SRS transmissions 425 at the beginning of the PUSCH/ PUCCH assignment. In some cases, the indicator is included in the PDCCH, the PFFICH, or in a special PDCCH, as described above with reference to FIG. 4A.

One or more UEs 115 may receive the indicator and determine that the SRS transmission time period is located at the beginning of the uplink transmissions 415-a. In some cases, the identified UEs 115 may additionally receive an uplink grant scheduling PUSCH and/or PUCCH transmissions. After receiving the indicator and/or uplink grant, the UEs 115 may perform a CCA to reserve the channel. After a successful CCA, a UE 115 may transmit a DMRS based preamble prior to transmitting precoded data symbols in uplink transmissions 415-a. The DMRS based preamble may be transmitted during SRS transmissions 425-a and may act as an SRS. In other cases, the UE 115 may transmit a DMRS based preamble prior to the uplink transmission 415-a in a CUBS during special subframe 420. In some cases, a UE 115 may be scheduled to transmit in a second or third uplink subframe. In this case the UE 115 may either perform a CCA prior to uplink transmissions 415-a or may perform the CCA prior to the scheduled uplink subframe. Aspects of the SRS transmission 425-a may be performed as described above with reference to FIG. 4A.

FIG. 4C illustrates an example of an SRS transmission scheme 400-c for the transmission of reference signals over shared spectrum in accordance with various aspects of the present disclosure. SRS transmission scheme 400-c may illustrate aspects of a transmission between a UE 115 and a base station 105, as described above with reference to FIGS. 1-4B. SRS transmission scheme 400-c may include subframes 405-b that may be designated for downlink transmissions 410-b, and special subframes 420-b to enable switching between uplink and downlink transmission. SRS transmission scheme 400-c may additionally include SRS transmissions 425-b. In some cases, transmissions over the shared spectrum may not include special subframe 420, but may include a gap between downlink transmissions 410 and uplink transmissions 415 during which a UE 115 may contend for access to the channel.

A base station 105 may identify one or more UEs 115 that are scheduled to transmit an SRS transmissions 425-b subsequent to the assigned uplink transmissions 415-b. The base station 105 may include in downlink transmissions 410-b an indicator that aperiodically triggers the identified UEs 115 to perform SRS transmissions 425-b following the conclusion of the PUSCH/PUCCH assignment. In some cases, the indicator is included in the PDCCH, the PFFICH, or in a special PDCCH as described above with reference to FIGS. 4A-4B.

One or more UEs 115 may receive the indicator and determine that the SRS transmission time period is located subsequent to uplink transmissions 415-b. In some cases, the identified UEs 115 may additionally receive an uplink grant scheduling PUSCH and/or PUCCH transmissions. After receiving the indicator and/or uplink grant, the UEs 115 may transmit SRS transmissions 425-b after uplink transmissions 415-b have completed. In some cases, the UEs 115 may perform a CCA prior to uplink transmissions 415-b and transmit SRS during SRS transmissions 425-b. In some cases, a UE 115 may be allocated to transmit for two of the three uplink subframes. In this case, the UE 115 may transmit an SRS subsequent to the second uplink subframe. Aspects of the SRS transmission 425-b may be performed as described above with reference to FIG. 4A-4B.

Figure 4D:
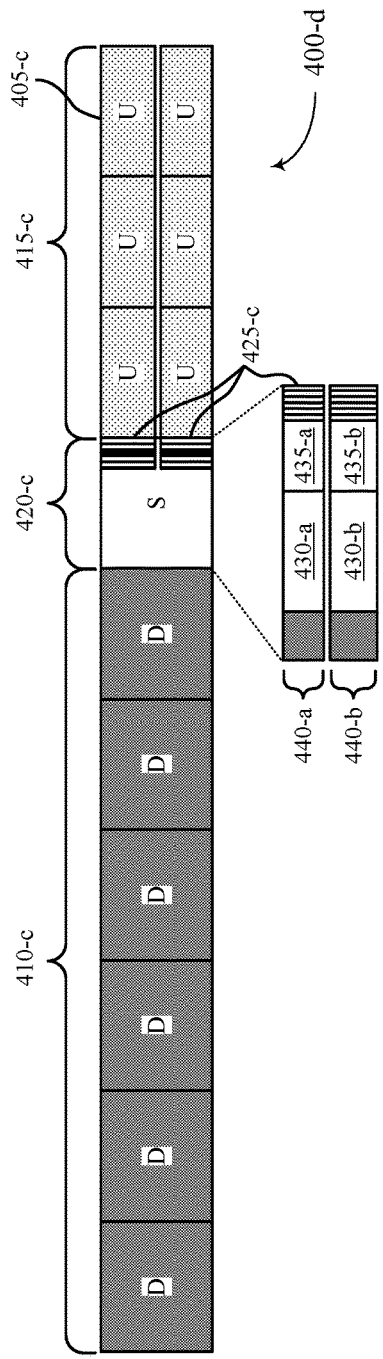

FIG. 4D illustrates an example of an SRS transmission scheme 400-d for the transmission of reference signals over shared spectrum in accordance with various aspects of the present disclosure. SRS transmission scheme 400-d may illustrate aspects of a transmission between a UE 115 and a base station 105, as described above with reference to FIGS. 1-4C. SRS transmission scheme 400-d may include subframes 405-c that may be designated for downlink transmissions 410-c, uplink transmissions 415-c, and special subframes 420-c to enable switching between uplink and downlink transmission. SRS transmission scheme 400-c may additionally include SRS transmissions 425-c. LBT procedures 440 including CCAs 430 and CUBS 435 may be used to monitor and reserve the channel prior to transmissions. LBT procedure 440-a may be performed for a first frequency subband and LBT procedure 440-b may be performed for a second frequency subband of SRS transmission scheme 400-d. In some cases, transmissions over the shared spectrum may not include special subframe 420, but may include a gap between downlink transmissions 410 and uplink transmissions 415 during which a UE 115 may contend for access to the channel.

A base station 105 may identify one or more UEs 115 that are scheduled to transmit an SRS transmissions 425-c prior to the assigned uplink transmissions 415-c. The base station 105 may include in downlink transmissions 410-c an indicator that aperiodically triggers the identified UEs 115 to perform SRS transmissions 425-c prior to the beginning of a PUSCH/PUCCH assignment. In some cases, the indicator is included in the PDCCH, the PFFICH, or in a special PDCCH as described above with reference to FIGS. 4A-4C.

One or more UEs 115 may receive the indicator and determine that the SRS transmission time period is located prior to uplink transmissions 415-c. In some cases, the identified UEs 115 may additionally receive an uplink grant scheduling PUSCH and/or PUCCH transmissions. After receiving the indicator and/or uplink grant, the UEs 115 may transmit SRS transmissions 425-c during special subframe 420-c (e.g., during UpPTS). Depending on the number of symbols allocated to the UpPTS, the SRS transmissions 425-c may use one or two symbols periods. In one example, a UE 115 performs a CCA 430, which may be an eCCA. Prior to transmitting over the medium the UE 115 may transmit a CUBS 435-a to reserve the channel. After transmitting the CUBS 435-a, the UE 115 may perform SRS transmissions 425-c during the UpPTS. Following the SRS transmissions 425-c the UE 115 may begin uplink transmissions 415-c. This scheme may provide for continuous transmission and prevent other devices from attempting to access the channel.

A base station 105 may schedule periodic or aperiodic SRS reports prior to uplink transmissions 415-c. For aperiodic reporting, an indicator may be included in PDCCH to aperiodically trigger UEs 115 to transmit during SRS transmissions 425-c. For periodic reporting, the base station 105 may configure one or more UEs 115 for periodic SRS reporting with an RRC message. The RRC message may include periodicity, offset, and frequency hopping pattern parameters. In subsequent transmissions (e.g., in a PDCCH) the base station 105 may include a frame number that a UE 115 may use to determine which special subframe 420-c to transmit during based on the above parameters. The UE 115 may perform a CCA and transmit a CUBS prior to SRS transmissions 425-c. Aspects of the SRS transmission 425-c may be performed as described above with reference to FIG. 4A-4C.

Figure 4E:
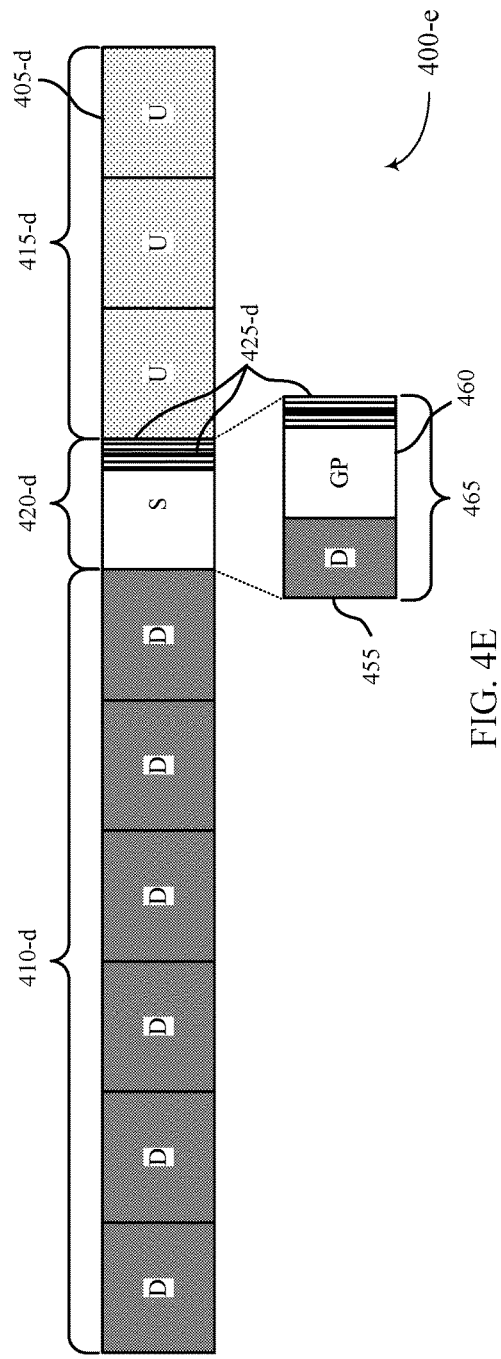

FIG. 4E illustrates an example of an SRS transmission scheme 400-e for the transmission of reference signals over shared spectrum in accordance with various aspects of the present disclosure. SRS transmission scheme 400-e may illustrate aspects of a transmission between a UE 115 and a base station 105, as described above with reference to FIGS. 1-4D. SRS transmission scheme 400-e may include subframes 405-d that may be designated for downlink transmissions 410-d, uplink transmissions 415-d, and special subframes 420-d to enable switching between uplink and downlink transmission. SRS transmission scheme 400-d may additionally include SRS transmissions 425-d. In some cases, transmissions over the shared spectrum may not include special subframe 420, but may include a gap between downlink transmissions 410 and uplink transmissions 415 during which a UE 115 may contend for access to the channel.

Similar to the above, a base station 105 may identify one or more UEs 115 that are scheduled to transmit SRS transmissions 425-d prior to the assigned uplink transmissions 415-d and transmit an indicator. In some cases, the indicator is included in the PDCCH, the PFFICH, or in a special PDCCH as described above with reference to FIGS. 4A-4D. In this case, the indicator may schedule a UE 115 to perform a wideband SRS transmission 425-d or may schedule the UE 115 to perform an SRS transmission 425-d that is in a different subband than the scheduled PUSCH/PUCCH.

One or more UEs 115 may receive the indicator and determine that the SRS transmission time period is located prior to uplink transmissions 415-d. In some cases, the identified UEs 115 may additionally receive an uplink grant scheduling PUSCH and/or PUCCH transmissions. After receiving the indicator and/or uplink grant, the UEs 115 may transmit SRS transmissions 425-d during special subframe 420-d (e.g., during UpPTS). A UE 115 may perform a CCA prior to transmitting SRS transmissions 425-d. Depending on the number of symbols allocated to the UpPTS, the SRS transmissions 425-c may use one or two symbols periods. In some cases, the identified UEs 115 may receive the indicator in a special PDCCH 455 that directs the UEs 115 to transmit SRS transmissions 425-d in a different subband. In some cases, a UE 115 may be configured for wideband sounding. In some cases, a gap (e.g., 17 µs) between the SRS transmissions 425-d and the uplink transmissions 415-d may occur. In this case, the gap may be sufficiently short to prevent WLAN or other LTE devices from attempting to access the medium.

Additionally or alternatively, the base station 105 may include in downlink transmissions 410-d an indicator that indicates a special SRS frame 465, in place of a special subframe 420, for SRS reporting to the identified UEs 115. The special SRS frame 465 may be utilized for SRS scheduling purposes without scheduling subsequent PUCCH or PUSCH transmissions, such as uplink transmissions 415-d. In some cases, the indicator is included in the PDCCH 455. A special SRS frame 465 may include a PDCCH 455, a guard period 460, and SRS transmission 425-d. The PDCCH 455 may include control information scheduling the SRS transmissions 425-d. The guard period 460 may be used as a transition between the downlink transmissions 410-d and/or PDCCH 455 and the SRS transmissions 425-d.

After receiving the indicator, the identified UEs 115 may transmit SRS transmissions 425-d during the special SRS frame 465. A UE 115 may perform a CCA during the guard period 460 and prior to transmitting SRS transmissions 425-d. After a successful CCA, a UE 115 may transmit a CUBS and interlace and resource index for transmission of the SRS transmissions 425-d. In some cases, the UE 115 may CCA over multiple bands and transmit the SRS transmissions 425-d in each band that the UE 115 observed a clear CCA. Multiple UEs 115 may transmit the SRS transmissions 425-d using FDM, CDM, or TDM techniques.

Aspects of the SRS transmissions 425-*d* may be performed as described above with reference to FIG. 4A-4D.

FIG. 4F illustrates an example of an SRS transmission scheme 400-*f* for the transmission of reference signals over shared spectrum in accordance with various aspects of the present disclosure. SRS transmission scheme 400-*f* may illustrate aspects of a transmission between a UE 115 and a base station 105, as described above with reference to FIGS. 1-4D. SRS transmission scheme 400-*f* may include subframes 405-*e* that may be designated for downlink transmissions 410-*e*, uplink transmissions 415-*e*, and special subframes 420-*e* to enable switching between uplink and downlink transmission. SRS transmission scheme 400-*f* may additionally include SRS transmissions 425-*e*. In some cases, transmissions over the shared spectrum may not include special subframe 420, but may include a gap between downlink transmissions 410 and uplink transmissions 415 during which a UE 115 may contend for access to the channel.

A base station 105 may identify one or more UEs 115 that are scheduled to perform SRS transmissions 425-*e* during an SRS subframe 445. The base station 105 may include in downlink transmissions 410-*e* an indicator that aperiodically triggers the identified UEs 115 to transmit SRS transmissions 425-*e* during SRS subframe 445. SRS subframe 445 may extend through an uplink subframe of uplink transmissions 415-*e*. In some cases, the indicator is included in the PDCCH, the PFFICH, or in a special PDCCH as described above with reference to FIGS. 4A-4E.

One or more UEs 115 may receive the indicator and identify that SRS subframe 445 has been scheduled for SRS transmissions 425-*e*. In some cases, the identified UEs 115 may additionally receive an uplink grant scheduling PUSCH and/or PUCCH transmissions. After receiving the indicator and/or uplink grant, the UEs 115 may transmit SRS transmissions 425-*e* during SRS subframe 445. A UE 115 may perform a CCA prior to transmitting SRS transmissions 425-*e*. In some cases, the identified UEs 115 may receive the indicator in a special PDCCH that directs the UEs 115 to transmit SRS transmissions 425-*e* in a different subband than the subband that is scheduled for the PDSCH or PUCCH. In this case, a UE 115 may be configured for wideband sounding. Aspects of the SRS transmission 425-*a* may be performed as described above with reference to FIG. 4A-4E.

Additionally or alternatively, the base station 105 may include in downlink transmissions 410-*e* an indicator that indicates a special SRS frame 465-*a*, in place of a special subframe 420-*e*, for SRS reporting to the identified UEs 115. The special SRS frame 465-*a* may be utilized for SRS scheduling purposes without scheduling PUCCH or PUSCH transmissions (e.g., the second and third subframes of uplink transmissions 415-*e*). In some cases, the indicator is included in the PDCCH. A special SRS frame 465-*a* may include a PDCCH 455-*a*, a guard period 460-*a*, and SRS transmissions 425-*e*. The PDCCH 455-*a* may include control information scheduling the SRS transmissions 425-*e* and allocating SRS subframes 445. The guard period 460-*a* may be used as a transition between the PDCCH and the SRS transmissions 425-*e*. In some cases, the control information scheduling the SRS transmissions 425-*e* is included in downlink transmissions 410-*e* and special SRS frame 465-*a* does not include PDCCH 455-*a* or guard period 460-*a*. Instead a transmission gap (e.g., a period where neither downlink nor uplink transmissions are performed by the UE 115 or base station 105) during which a UE 115 may contend for access to the channel may span the duration of the special subframe 420-*e*.

After receiving the indicator, the identified UEs 115 may identify the special SRS frame 465-*a* and transmit SRS transmissions 425-*e* during the allocated SRS subframe 445. A UE 115 may perform a CCA during the guard period 460-*a* and prior to transmitting SRS transmissions 425-*e*. After a successful CCA, a UE 115 may transmit a CUBS and interlace and resource index for transmission of the SRS transmissions 425-*e*. In some cases, the UE 115 may CCA over multiple bands and transmit the SRS transmissions 425-*e* in each band that the UE 115 observed a clear CCA. Multiple UEs 115 may transmit the SRS transmissions 425-*e* using FDM, CDM, or TDM techniques.

A base station 105 may use the special SRS frame 465-*a* to trigger periodic or aperiodic SRS reports. For aperiodic reporting, an indicator may be included in PDCCH 455-*a* to aperiodically trigger UEs 115 to perform SRS transmissions 425-*e* during SRS subframe 445. For periodic reporting, the base station 105 may configure one or more UEs 115 for periodic SRS reporting with an RRC message. The RRC message may include periodicity, offset, and frequency hopping pattern parameters. In subsequent transmissions (e.g., in a PDCCH) the base station 105 may include a special SRS frame number that a UE 115 may use to determine which special SRS frame 465-*a* to transmit during based on the above parameters. The UE 115 may perform a CCA and transmit a CUBS prior to SRS transmissions 425-*e*. Aspects of the SRS transmissions 425-*e* may be performed as described above with reference to FIG. 4A-4E.

FIG. 4G illustrates an example of an SRS transmission scheme 400-*g* for the transmission of reference signals over shared spectrum in accordance with various aspects of the present disclosure. SRS transmission scheme 400-*g* may illustrate aspects of a transmission between a UE 115 and a base station 105, as described above with reference to FIGS. 1-4F. SRS transmission scheme 400-*g* may include subframes 405-*f* that may be designated for downlink transmissions 410-*f*, uplink transmissions 415-*f* or to enable switching between uplink and downlink transmission using special subframes 420-*f*. SRS transmission scheme 400-*g* may additionally include SRS transmissions 425-*f*, which may be transmitted as an unprecoded DMRS. In some cases, transmissions over the shared spectrum may not include special subframe 420, but may include a transmission gap spanning a duration of the special subframe 420-*e* during which a UE 115 may contend for access to the channel.

A base station 105 may identify one or more UEs 115 that are scheduled to transmit SRS transmissions 425-*f* during a scheduled CET period 450. The base station 105 may include in downlink transmissions 410-*f* an indicator that aperiodically triggers the identified UEs 115 to transmit SRS transmissions 425-*f* during a CET period 450. The CET period 450 may be periodically scheduled by the base station 105. For instance, the CET period 450 may be scheduled once every 80 ms. In some cases, the indicator is included in the PDCCH, the PFFICH, or in a special PDCCH as described above with reference to FIGS. 4A-4F.

One or more UEs 115 may receive the indicator and identify that CET period 450 has been scheduled for SRS transmissions 425-*f*. In some cases, the identified UEs 115 may additionally receive an uplink grant scheduling PUSCH and/or PUCCH transmissions. After receiving the indicator and/or uplink grant, the UEs 115 may transmit SRS transmissions 425-*e* during CET period 450. Aspects of the SRS transmissions 425-f may be performed as described above with reference to FIG. 4A-4F.

Figure 5:
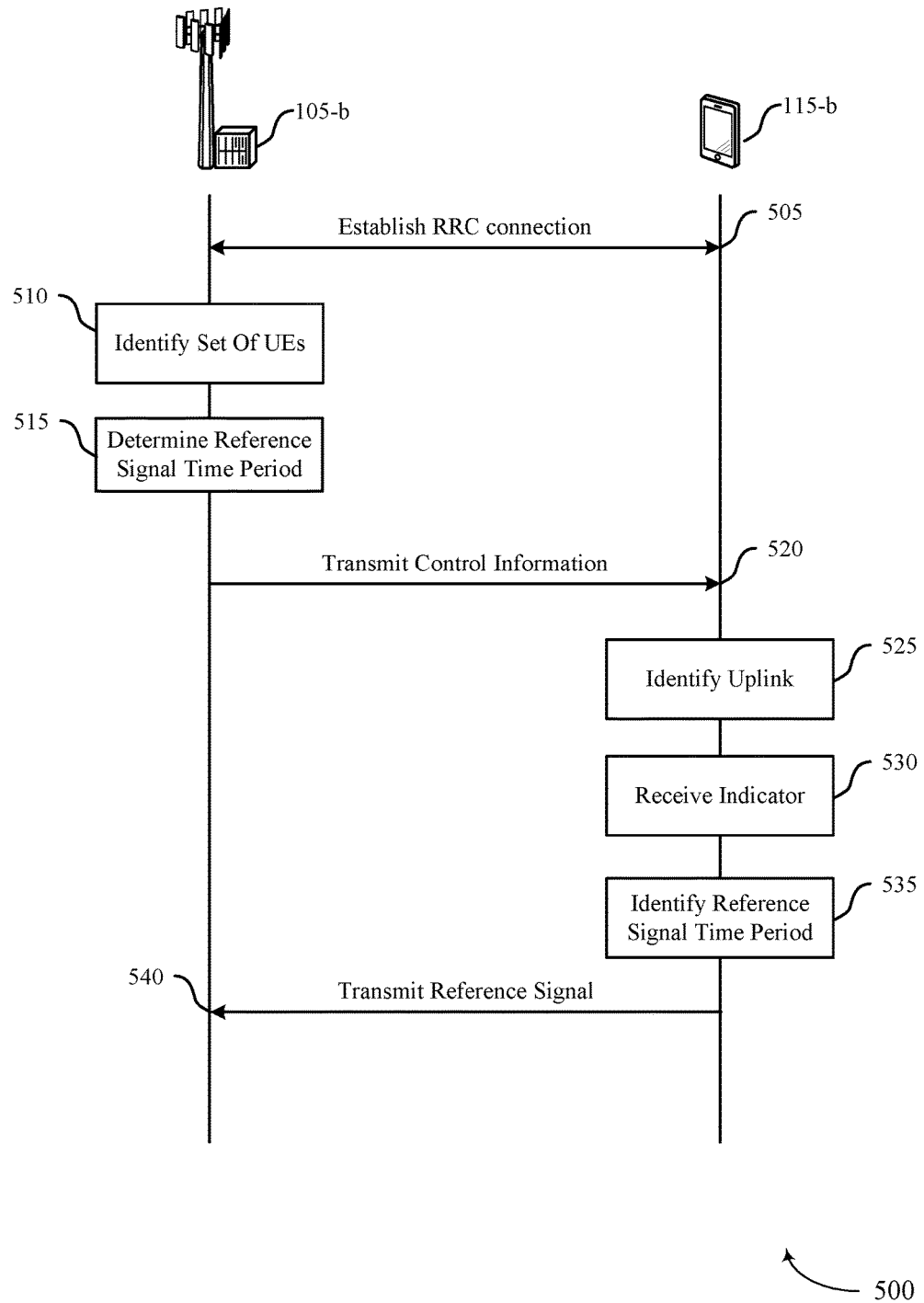
FIG. 5 illustrates an example of a process flow that supports the transmission of reference signals over shared spectrum in accordance with various aspects of the present disclosure.

FIG. 5 illustrates an example of a process flow 500 for the transmission of reference signals over shared spectrum in accordance with various aspects of the present disclosure. Process flow 500 may be performed by UE 115-b and base station 105-b, which may be an example of a UE 115 and base station 105 described above with reference to FIGS. 1-4G. In some examples, UE 115-b may receive a reference signal indicator and/or an uplink grant from base station 105-b. The UE 115-b may use the indicator to determine a reference signal transmission time to transmit an SRS signal.

At step 505, base station 105-b and UE 115-b may establish an RRC connection. In some cases, establishing an RRC connection may include sending an RRC message to determine if UE 115-b is capable of using eCCs and/or the shared channel. In some cases, UE 115-b may send an RRC message to base station 105-b advertising eCC and shared channel capabilities. An additional RRC message may be sent to configure UE 115-b to operate in a shared channel and to use an eCC. The RRC message may additionally be used to configure UE 115-b for periodic reference signal transmissions. For instance, the RRC message may include periodicity, offset, and frequency hopping parameter associated with the periodic reference signal transmissions. The RRC message may additionally include a frame number or special subframe number.

At step 510, base station 105-b may identify a set of UEs 115, including UE 115-b, that are scheduled to transmit reference signals (e.g., SRS). At step 515, base station 105-b may determine a reference signal time period for transmitting the reference signals relative to uplink transmission scheduled in a forthcoming TDD configuration based on the identified UEs 115. In some cases, base station 105-b may determine that the reference signal time period occurs prior to, during, or subsequent to uplink transmissions that may be scheduled for UE 115-b. In some cases, the base station 105-b may determine that no uplink transmissions are scheduled and may indicate to UE 115-b to perform SRS transmissions. For instance, the base station may determine that a special SRS frame that does not include subsequent uplink subframes will be utilized, such as a special SRS frame 465 as described with reference FIGS. 4E and 4F. In other cases, the base station may determine that CET resources will be used for reference signal transmissions.

At step 520, base station 105-b may generate an indicator based on the determined reference signal time period and transmit the indicator within control information to UE 115-b. The indicator may be used to aperiodically or periodically schedule reference signal transmissions. In some cases, the indicator may be used to indicate that the reference signal time period is prior to, during, or subsequent to uplink transmissions. In other cases, the indicator may be used to indicate that the reference signal transmission will occur during scheduled CET resources. In some cases, the indicator may be used to indicate that uplink transmissions have not been scheduled and that a special SRS frame will be utilized. In yet another case, the indicator may indicate an offset, periodicity, frequency hopping scheme, frame number, or special frame number for periodic reference signal transmissions. The indicator may additionally be used to allocate time and frequency resources to UE 115-b for reference signal transmissions. The indicator may be sent using the PDCCH, PFFICH, or a special PDCCH.

At step 525, UE 115-b may receive the control information and identify an uplink transmission time period. In some cases, UE 115-b may receive an uplink grant in the PDCCH and determine uplink resource allocation in addition to the indicator. For instance, UE 115-b may determine that the PDCCH schedules a subsequent PUSCH and PUCCH. In some cases, UE 115-b may determine that neither the PUSCH nor the PUCCH has been scheduled. At step 530, UE 115-b may receive the indicator based on the indicator generated at base station 105-b.

At step 535, UE 115-b may identify a reference signal time period based on the received indicator and uplink grant. For instance, UE 115-b may determine that the reference signal time period is prior to, during, or subsequent to the uplink transmission time period. In some cases, UE 115-b may determine that the reference signal time period is during a special subframe (e.g., during UpPTS) or special SRS subframe. In other cases, UE 115-b may determine that the reference signal transmission time period occurs during CET resources. In another case, UE 115-b may determine that uplink resources have not been allocated and determine that the reference signal transmission period occurs during a special SRS subframe. UE 115-b may additionally determine time and frequency resource for reference signal transmissions based on the received indicator. For instance, UE 115-b may be scheduled to transmit a reference signal in a subband that is different than the subband used to schedule UE's 115-b PUSCH/PUCCH. In another example, UE 115-b may be scheduled to transmit a wideband reference signal across multiple subband. In some cases, the indicator may alert UE 115-b to transmit a reference signal without designating a location relative to an uplink transmissions period. In this case, UE 115-b may receive the indicator and transmit the reference signal according to a pre-determined configuration. For instance, the network may be configured for reference signal transmissions that occur at the end of uplink transmissions. UE 115-b may receive an indicator associated with the uplink transmission of a reference signal and may transmit a reference signal at the end of an uplink transmission without further determining a location for the reference signal transmission.

At step 540, UE 115-b may transmit a reference signal based on the identified reference signal time period and the allocated time and frequency resources. Prior to transmitting a reference signal UE 115-b may perform a CCA to determine if the channel is clear. In some cases, the CCA is performed prior to an uplink transmission, a reference signal transmission, or both. After determining the channel is clear UE 115-b may transmit a CUBS to reserve the channel. UE 115-b may then proceed to transmit reference signals during the identified reference signal transmission period. UE 115-b may interleave and resource index reference signal transmission to occupy the subband and accommodate reference signal transmissions from other UEs 115. In some cases, UE 115-b may transmit reference signals using CDM, FDM, or TDM techniques to accommodate an increased number of UEs 115.

Figure 6:
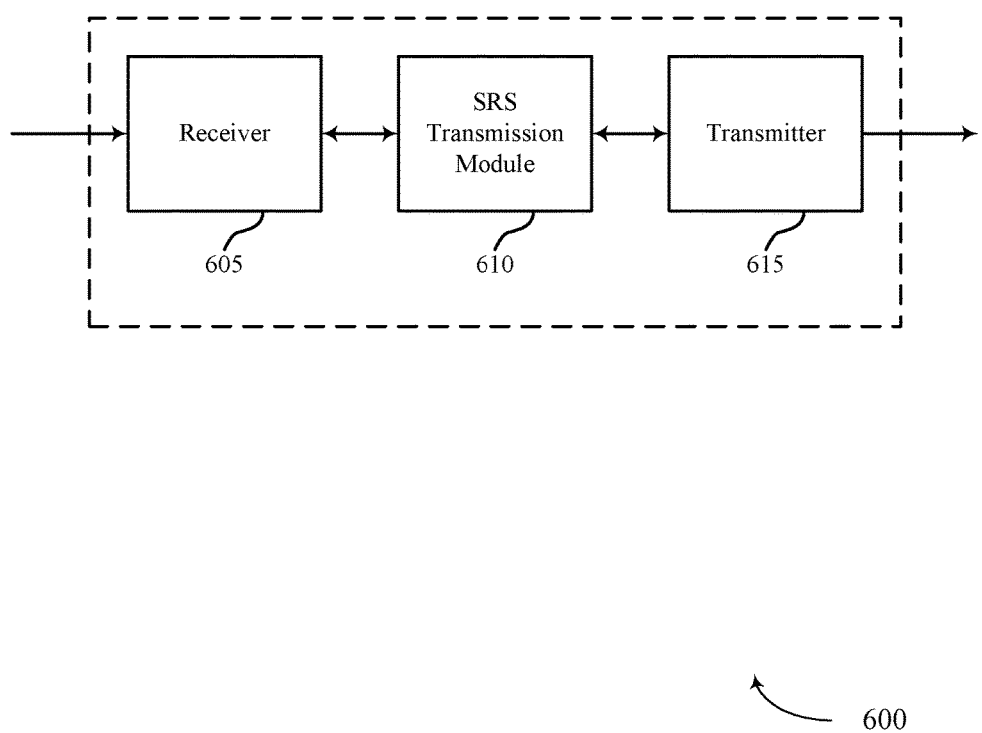
FIGS. 6-8 show block diagrams of a wireless device that supports the transmission of reference signals over shared spectrum in accordance with various aspects of the present disclosure.

FIG. 6 shows a block diagram of a wireless device 600 that supports the transmission of reference signals over shared spectrum in accordance with various aspects of the present disclosure. Wireless device 600 may be an example of aspects of a UE 115 described with reference to FIGS. 1-5. Wireless device 600 may include a receiver 605, a SRS transmission module 610, or a transmitter 615. Wireless device 600 may also include a processor. Each of these components may be in communication with each other.

The receiver 605 may receive information such as packets, user data, or control information associated with various information channels (e.g., control channels, data channels, and information related to techniques for managing transmissions of reference signals, etc.). Information may be passed on to the SRS transmission module 610, and to other components of wireless device 600. In some examples, the receiver 605 may receive the indicator in a special PDCCH, the special PDCCH indicating a plurality of frequency sub-bands for transmitting the reference signal. In some examples, the receiver 605 may receive the indicator in a special PDCCH, the special PDCCH indicating to an unscheduled wireless device 600 to transmit an SRS during an unscheduled time period—i.e., to transmit when the wireless device 600 is not scheduled to transmit during an uplink transmission period scheduled for other wireless devices or in the same band as a scheduled uplink transmission time period. In some examples, the indicator is received over one of a PDCCH or a PFFICH.

The SRS transmission module 610 may identify an uplink transmission time period associated with a shared radio frequency spectrum band, receive an indicator in a downlink transmission associated with an uplink transmission of a reference signal, identify a reference signal time period relative to the uplink transmission time period, and transmit the reference signal over the shared radio frequency spectrum band during the identified reference signal time period.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas. In some examples, the transmitter 615 may transmit the reference signal over the shared radio frequency spectrum band during the identified reference signal time period. In some examples, the transmitter 615 may transmit reference signal as a demodulation reference signal (DMRS) based preamble. In some examples, the transmitter 615 may transmit the reference signal as a channel usage beacon signal (CUBS) preamble.

Figure 7:
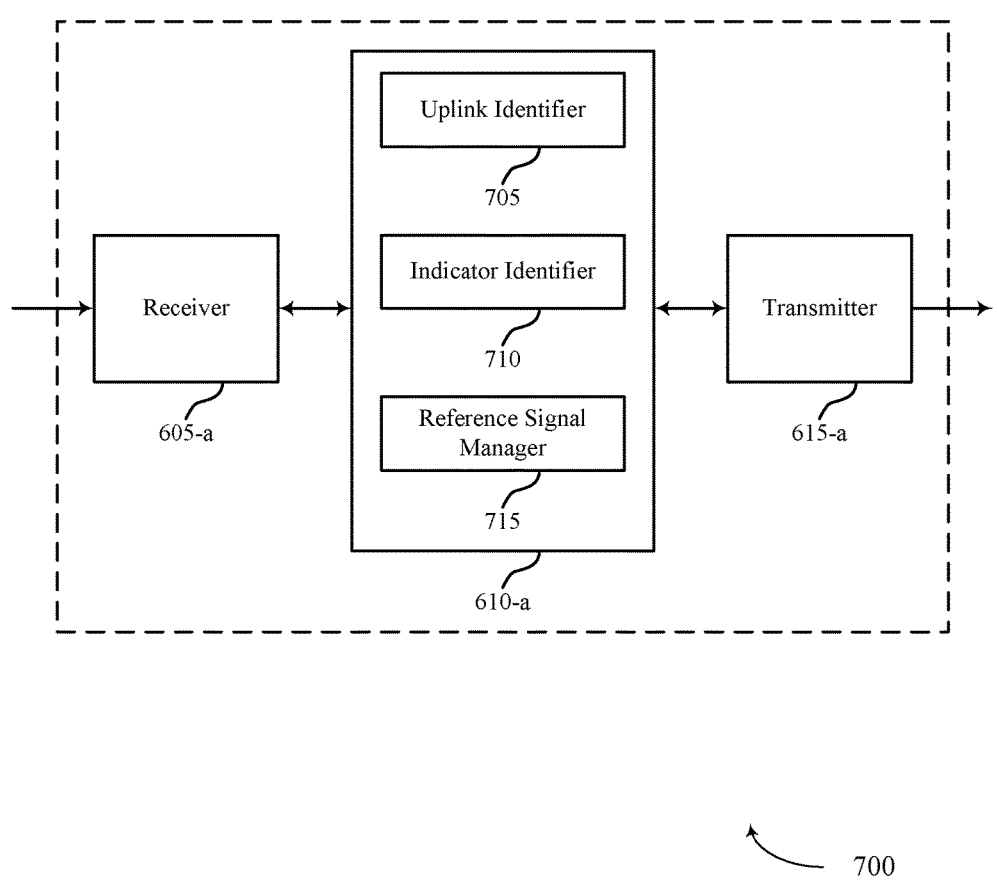

FIG. 7 shows a block diagram of a wireless device 700 that supports the transmission of reference signals over shared spectrum in accordance with various aspects of the present disclosure. Wireless device 700 may be an example of aspects of a wireless device 600 or a UE 115 described with reference to FIGS. 1-6. Wireless device 700 may include a receiver 605-*a*, a SRS transmission module 610-*a*, or a transmitter 615-*a*. Wireless device 700 may also include a processor. Each of these components may be in communication with each other. The SRS transmission module 610-*a* may also include an uplink identifier 705, an indicator identifier 710, and a reference signal manager 715.

The receiver 605-*a* may receive information which may be passed on to SRS transmission module 610-*a*, and to other components of wireless device 700. The SRS transmission module 610-*a* may perform the operations described with reference to FIG. 6. The transmitter 615-*a* may transmit signals received from other components of wireless device 700.

The uplink identifier 705 may identify an uplink transmission time period associated with a shared radio frequency spectrum band as described with reference to FIGS. 2-5. The uplink identifier 705 may also identify an uplink transmission time period, where the identified uplink transmission time period is not scheduled for the wireless device 700. In some examples, the uplink transmission time period comprises at least one uplink subframe. The uplink identifier 705 may also identify the uplink transmission time period is based at least in part on a received TDD configuration, wherein the received TDD configuration indicates subsequent uplink, downlink, and special subframes.

The indicator identifier 710 may receive an indicator in a downlink transmission, the indicator associated with an uplink transmission of a reference signal as described with reference to FIGS. 2-5. In some examples, the PDCCH comprises an uplink grant or a downlink grant that comprises the indicator. In some examples, the indicator may be indicated by setting a bit in the PFFICH.

The reference signal manager 715 may identify a reference signal time period relative to the uplink transmission time period as described with reference to FIGS. 2-5. The reference signal manager 715 may also determine the reference signal time period to be at a conclusion of the uplink transmission time period. The reference signal manager 715 may also determine the reference signal time period to be during a last symbol of an assigned PUSCH or last one or two symbols of a PUCCH. The reference signal manager 715 may also determine the reference signal time period to be at a beginning of the uplink transmission time period. The reference signal manager 715 may also determine the reference signal time period to be subsequent to a conclusion of the uplink transmission time period, the reference signal time period comprising at least one symbol. The reference signal manager 715 may also determine the reference signal time period to be during a portion of a special subframe based at least in part on identifying that the uplink transmission time period not being scheduled for the wireless device 700

The reference signal manager 715 may also determine the reference signal time period to be prior to a beginning of the uplink transmission time period. In some examples, the reference signal time period may be during a special subframe and comprises at least one symbol. In some examples, the reference signal time period corresponds to a first uplink subframe associated with the uplink transmission time period. In some examples, the reference signal time period comprises the uplink transmission period. In some examples, the reference signal time period comprises a CCA exempt transmission time period. In some examples, the CCA exempt transmission time period comprises at least a portion of an uplink subframe and may be periodically scheduled. In some examples, the reference signal time period comprises a portion of a special subframe. In some examples, a special SRS frame comprises the reference signal time period. The reference signal manager 715 may also identify the reference signal time period is based at least in part on the special SRS frame number, or the periodicity, or the offset, or the frequency hopping pattern. In some examples, the reference signal time period may be scheduled periodically or aperiodically.

Figure 8:
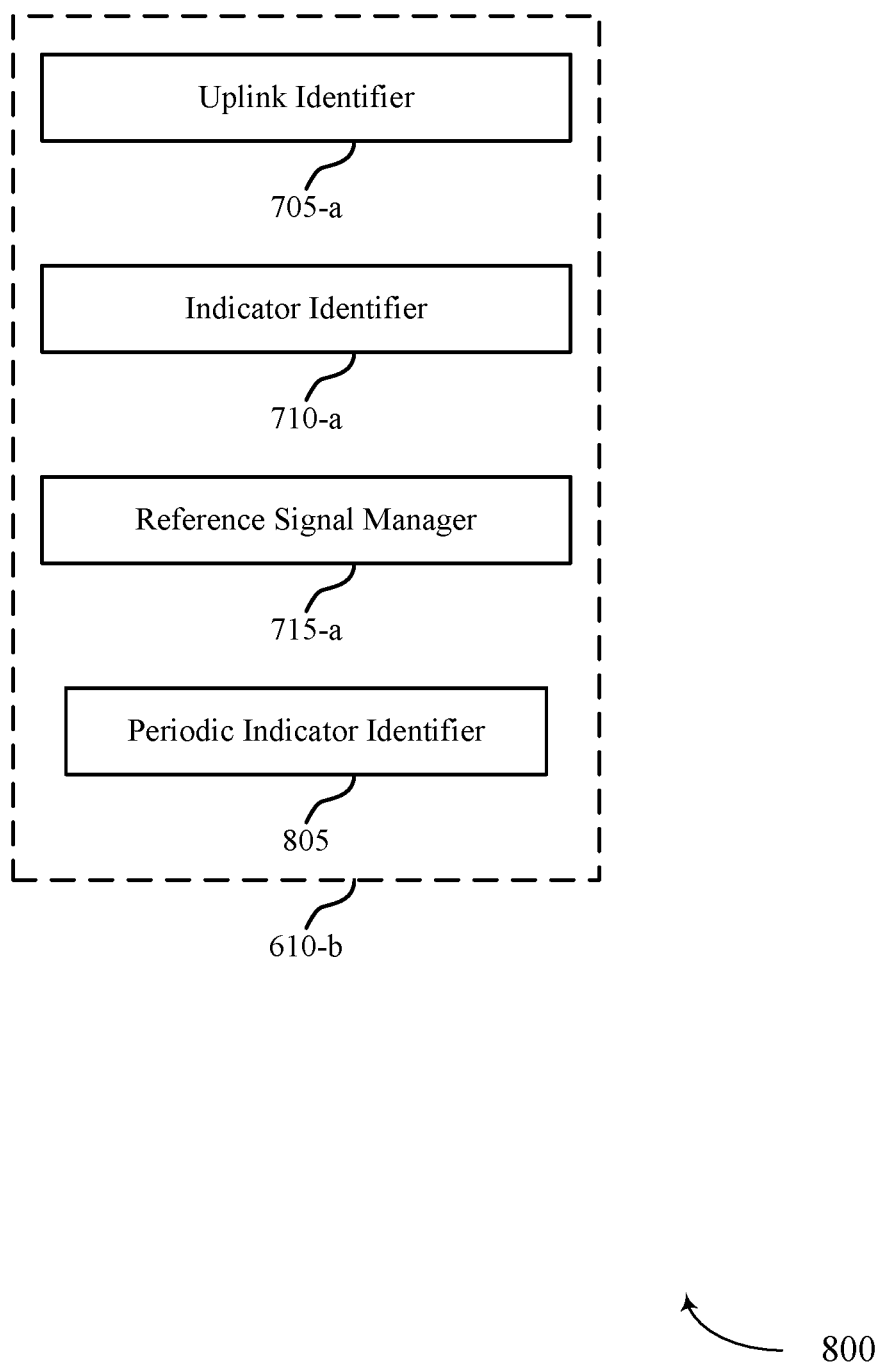

The reference signal manager 715 may also identify frequency and time resources to transmit the reference signal during the reference signal time period based at least in part on the received indicator. The reference signal manager 715 may also identify a relationship between the reference signal time period and the uplink transmission time period, wherein a location of the reference signal time period is at the beginning of the uplink transmission time period, or at the end of the uplink transmission time period, or prior to the uplink transmission time period, or subsequent to the uplink transmission time period, or comprising the uplink transmission time period. The reference signal manager 715 may also identify a relationship between the reference signal time period and the uplink transmission time period based at least in part on a periodicity, or an offset, or a frequency hopping pattern FIG. 8 shows a block diagram 800 of a SRS transmission module 610-*b* which may be a component of a wireless device 600 or a wireless device 700 that supports the transmission of reference signals over shared spectrum in accordance with various aspects of the present disclosure. The SRS transmission module 610-*b* may be an example of aspects of a SRS transmission module 610 described with reference to FIGS. 6-7. The SRS transmission module 610-*b* may include an uplink identifier 705-*a*, an indicator identifier 710-*a*, and a reference signal manager 715-*a*. Each of these modules may perform the functions described with reference to FIG. 7. The SRS transmission module 610-*b* may also include a periodic indicator identifier 805.

The periodic indicator identifier 805 may be configured such that the indicator includes a periodicity, offset, or a frequency hopping pattern as described with reference to FIGS. 2-5. In some examples, the indicator comprises a special SRS frame number associated with a special SRS frame.

Figure 9:
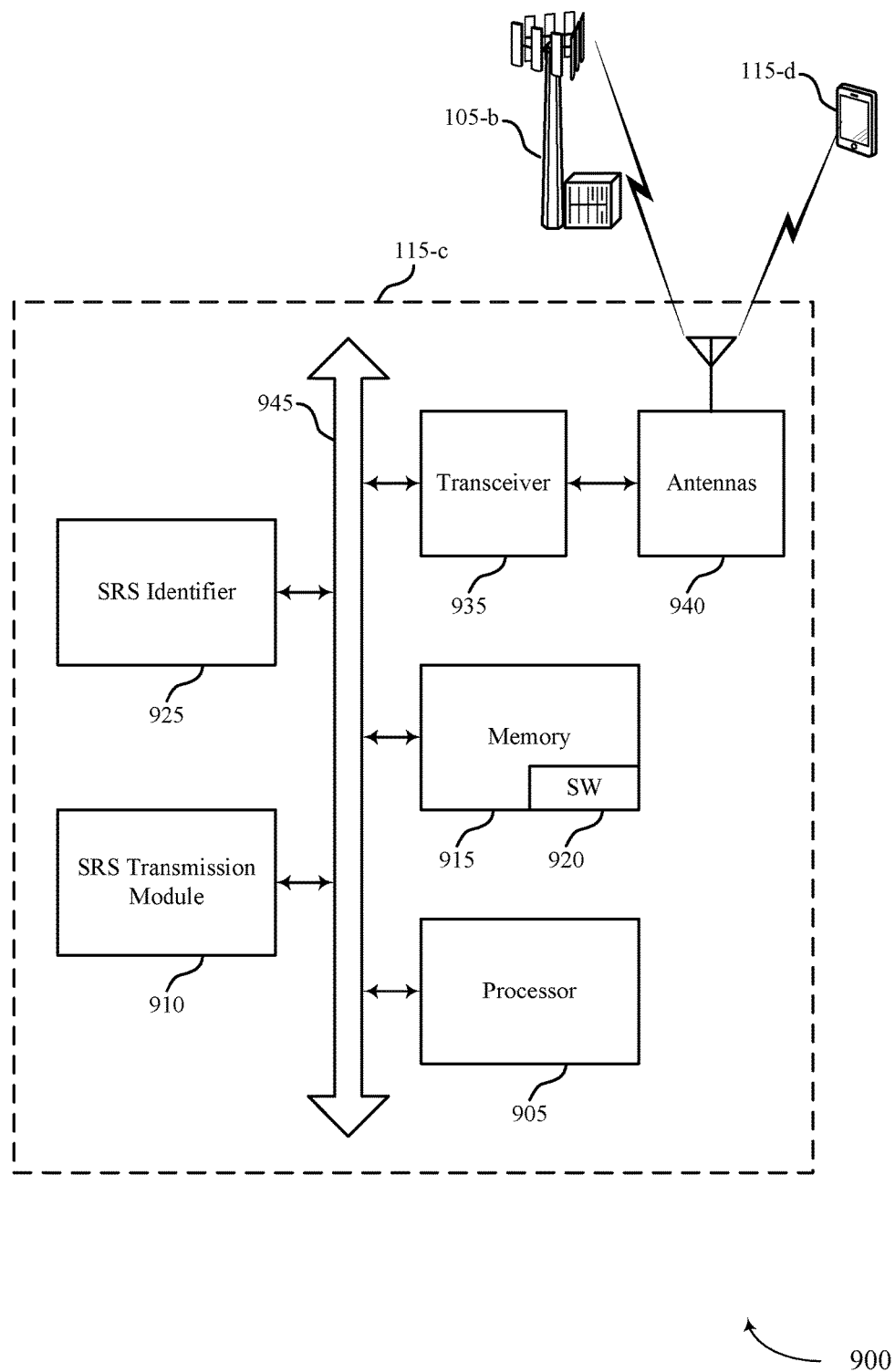
FIG. 9 illustrates a block diagram of a system including a user equipment (UE) that supports the transmission of reference signals over shared spectrum in accordance with various aspects of the present disclosure.

FIG. 9 shows a block diagram of a system 900 including a UE 115-*c* that supports the transmission of reference signals over shared spectrum in accordance with various aspects of the present disclosure. System 900 may include UE 115-*c*, which may be an example of a wireless device 600, a wireless device 700, or a UE 115 described with reference to FIGS. 1, 2, 6 and 7. UE 115-*c* may include a SRS transmission module 910, which may be an example of a SRS transmission module 610 described with reference to FIGS. 6-8. UE 115-*c* may also include a SRS identifier 925. UE 115-*c* may also include components for bi-directional voice and data communications including components for transmitting communications and components for receiving communications. For example, UE 115-*c* may communicate bi-directionally with UE 115-*d* or base station 105-*b*.

UE 115-*c* may also include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*c* may include a single antenna 940, UE 115-*c* may also have multiple antennas 940 capable of concurrently transmitting or receiving multiple wireless transmissions. SRS identifier 925 may be used to identify that UE 115-*c* has been scheduled for aperiodic or periodic SRS reporting.

The memory 915 may include random access memory (RAM) and read only memory (ROM). The memory 915 may store computer-readable, computer-executable software/firmware code 920 including instructions that, when executed, cause the processor 905 to perform various functions described herein (e.g., techniques for managing transmissions of reference signals, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
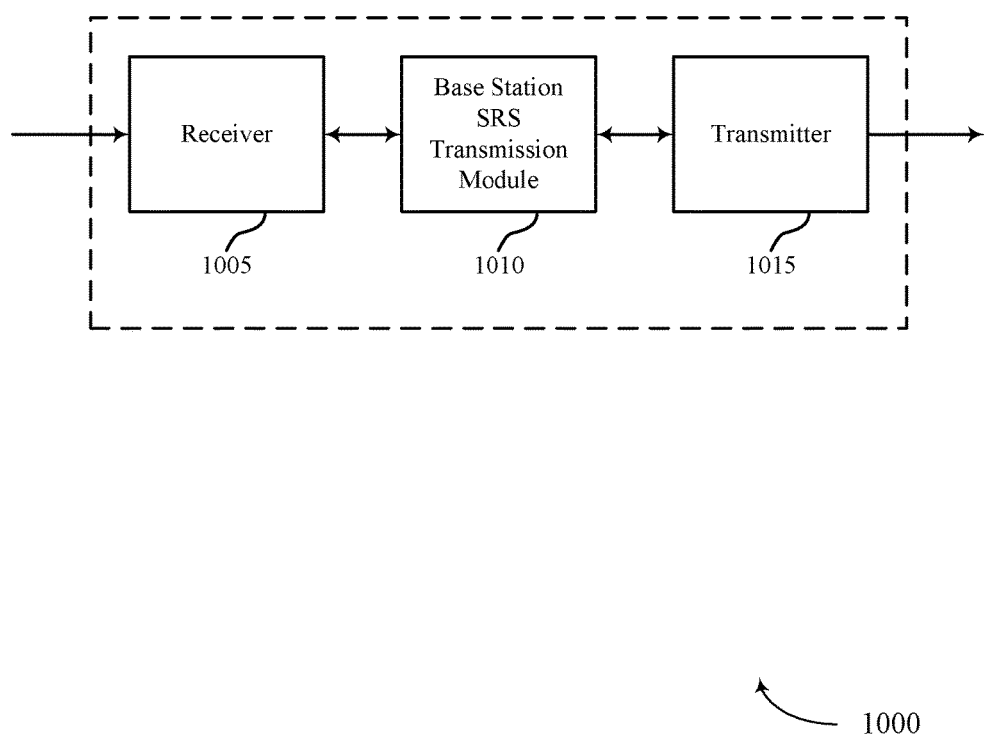
FIGS. 10-12 show block diagrams of a wireless device that supports the transmission of reference signals over shared spectrum in accordance with various aspects of the present disclosure.

FIG. 10 shows a block diagram of a wireless device 1000 that supports the transmission of reference signals over shared spectrum in accordance with various aspects of the present disclosure. Wireless device 1000 may be an example of aspects of a base station 105 described with reference to FIGS. 1-9. Wireless device 1000 may include a receiver 1005, a base station SRS transmission module 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to techniques for managing transmissions of reference signals, etc.). Information may be passed on to the base station SRS transmission module 1010, and to other components of wireless device 1000.

The base station SRS transmission module 1010 may identify a set of wireless devices that are scheduled to transmit reference signals, determine a reference signal time period for transmitting the reference signals in relation to the uplink transmission time period, and transmit an indication to the set of wireless devices associated with the determined reference signal time period relative to the uplink transmission time period.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas. In some examples, the transmitter 1015 may transmit an indication to the set of wireless devices associated with the determined reference signal time period relative to the uplink transmission time period.

Figure 11:
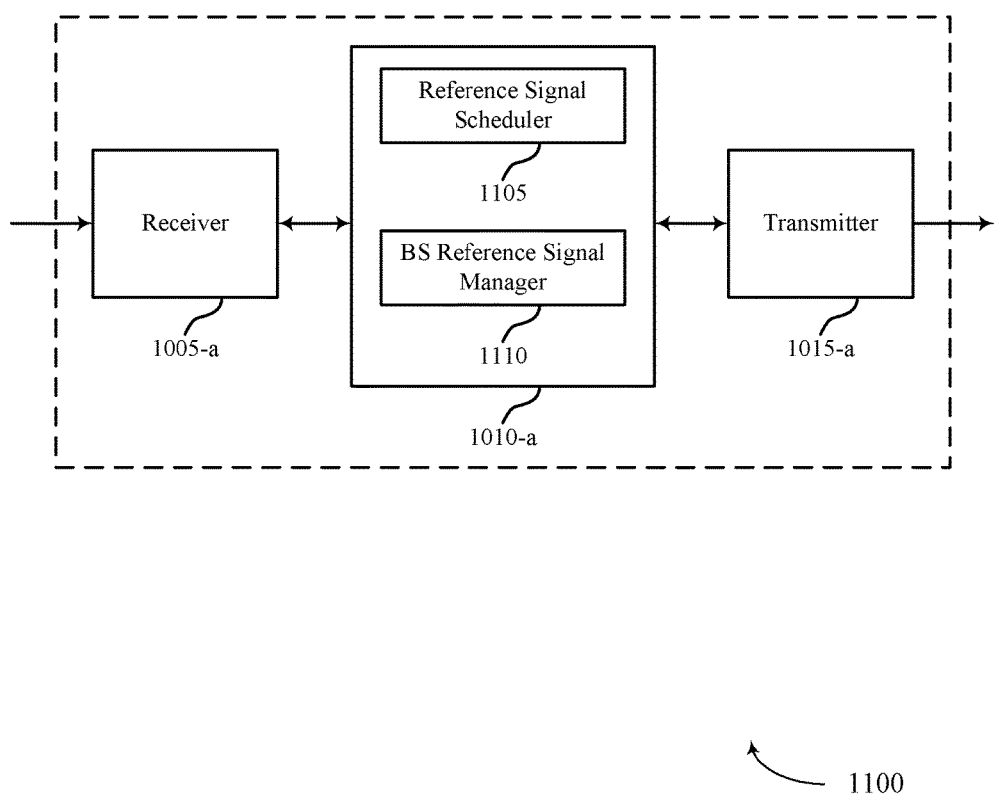

FIG. 11 shows a block diagram of a wireless device 1100 that supports the transmission of reference signals over shared spectrum in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station SRS transmission module 1010-*a*, or a transmitter 1015-*a*. Wireless device 1100 may also include a processor. Each of these components may be in communication with each other. The base station SRS transmission module 1010-*a* may also include a reference signal scheduler 1105, and a BS reference signal manager 1110.

The receiver 1005-*a* may receive information which may be passed on to base station SRS transmission module 1010-*a*, and to other components of wireless device 1100. The base station SRS transmission module 1010-*a* may perform the operations described with reference to FIG. 10. The transmitter 1015-*a* may transmit signals received from other components of wireless device 1100.

The reference signal scheduler 1105 may identify a set of wireless devices that are scheduled to transmit reference signals as described with reference to FIGS. 2-5. The BS reference signal manager 1110 may determine a reference signal time period for transmitting the reference signals in relation to the uplink transmission time period as described with reference to FIGS. 2-5.

Figure 12:
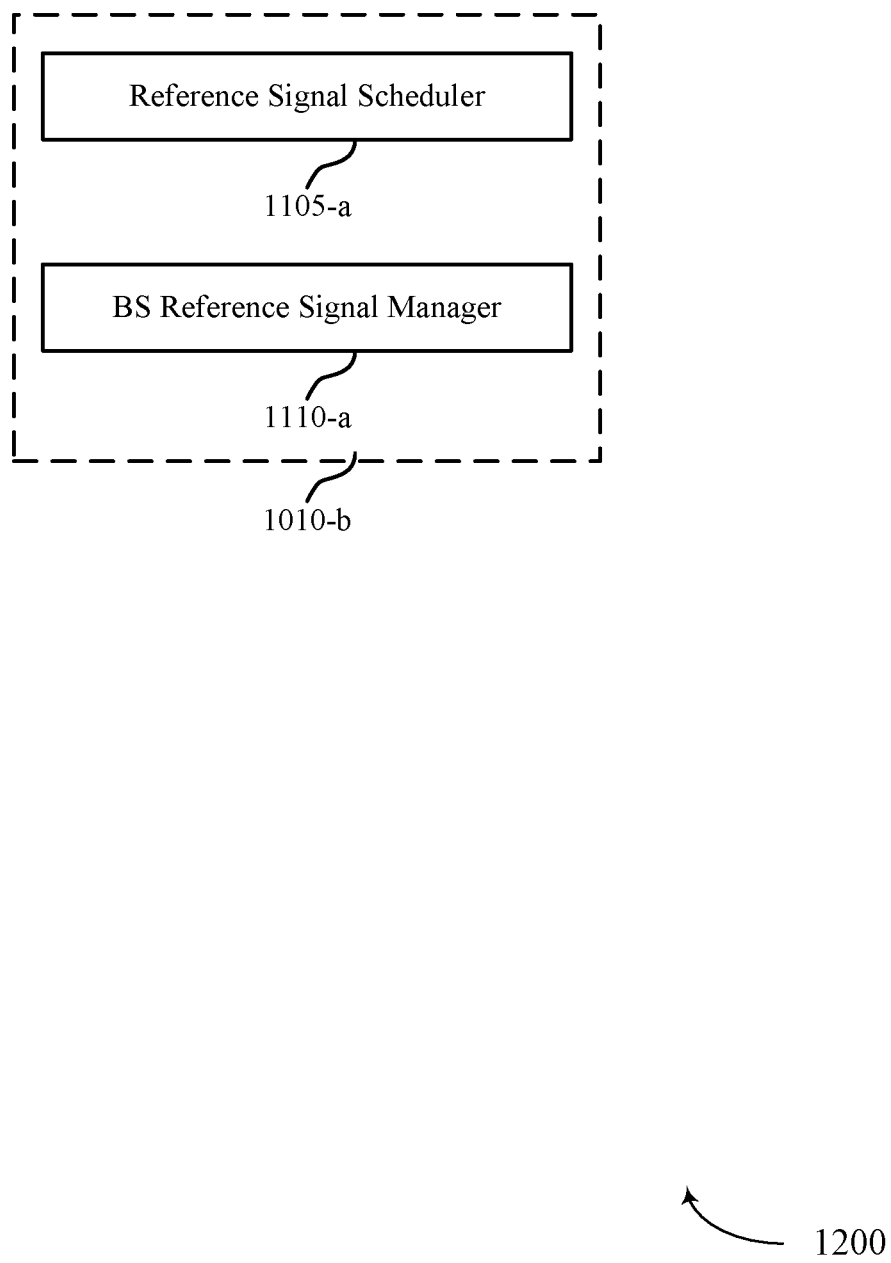

FIG. 12 shows a block diagram 1200 of a base station SRS transmission module 1010-*b* which may be a component of a wireless device 1000 or a wireless device 1100 that supports the transmission of reference signals over shared spectrum in accordance with various aspects of the present disclosure. The base station SRS transmission module 1010-*b* may be an example of aspects of a base station SRS transmission module 1010 described with reference to FIGS. 10-11. The base station SRS transmission module 1010-*b* may include a reference signal scheduler 1105-*a*, and a BS reference signal manager 1110-a. Each of these modules may perform the functions described with reference to FIG. 11.

Figure 13:
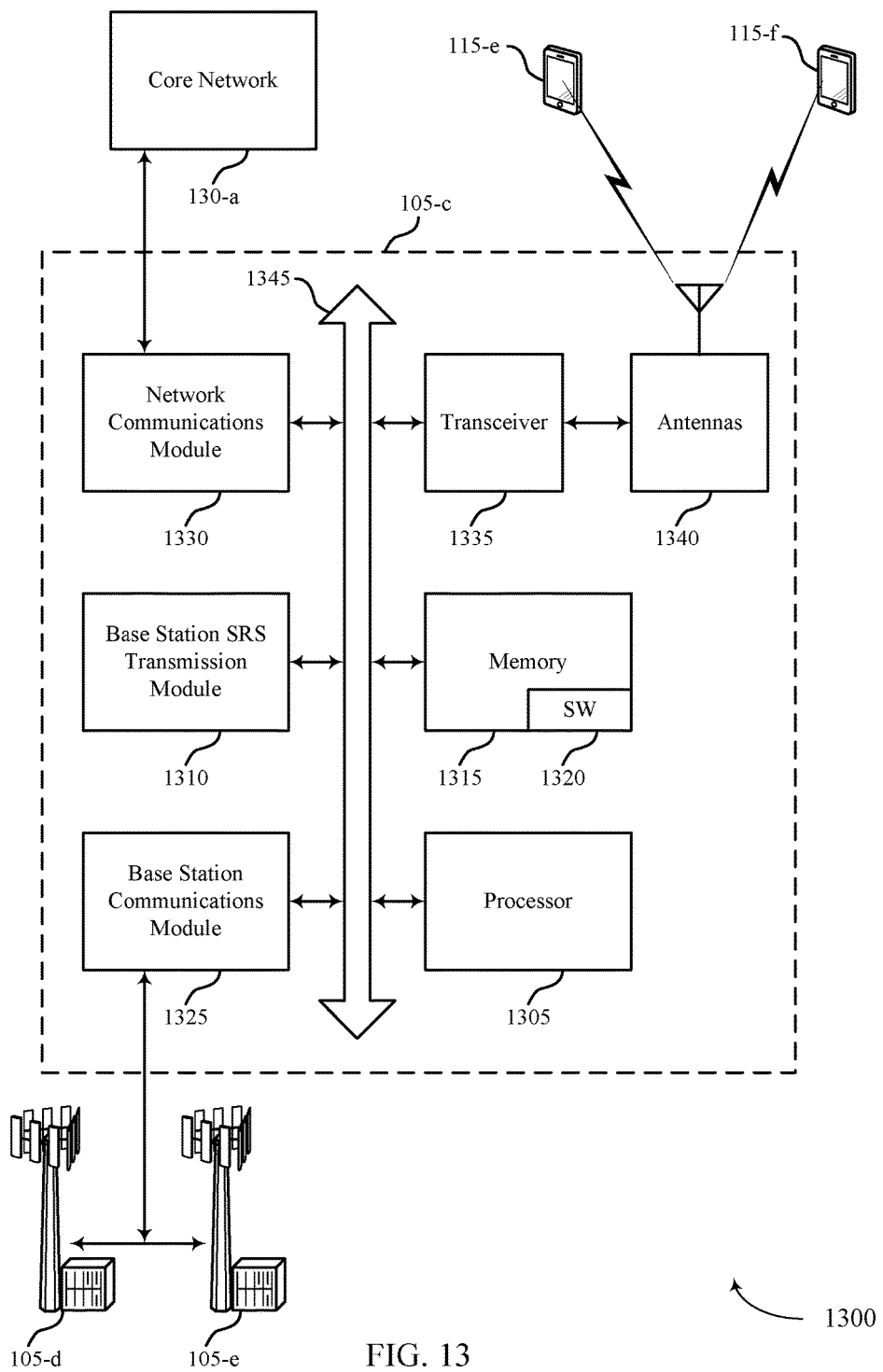
FIG. 13 illustrates a block diagram of a system including a base station that supports the transmission of reference signals over shared spectrum in accordance with various aspects of the present disclosure.

FIG. 13 shows a diagram of a system 1300 including a base station 105 that supports the transmission of reference signals over shared spectrum in accordance with various aspects of the present disclosure. System 1300 may include base station 105-c, which may be an example of a wireless device 1000, a wireless device 1100, or a base station 105 described with reference to FIGS. 1, 2, and 10-12. Base station 105-c may include a base station SRS transmission module 1310, which may be an example of a base station SRS transmission module 1010 described with reference to FIGS. 10-12. Base station 105-c may also include components for bi-directional voice and data communications including components for transmitting communications and components for receiving communications. For example, base station 105-c may communicate bi-directionally with UE 115-e, UE 115-f, base station 105-d, and base station 105-e.

In some cases, base station 105-c may have one or more wired backhaul links. Base station 105-c may have a wired backhaul link (e.g., S1 interface, etc.) to the core network 130. Base station 105-c may also communicate with other base stations 105, such as base station 105-d and base station 105-e via inter-base station backhaul links (e.g., an X2 interface). Each of the base stations 105 may communicate with UEs 115 using the same or different wireless communications technologies. In some cases, base station 105-c may communicate with other base stations, such as base stations 105-d and/or 105-e utilizing base station communications module 1325. In some examples, base station communications module 1325 may provide an X2 interface within a LTE/LTE-A wireless communication network technology to provide communication between some of the base stations 105. In some examples, base station 105-c may communicate with other base stations through core network 130. In some cases, base station 105-c may communicate with the core network 130 through network communications module 1330.

The base station 105-c may include a processor 1305, memory 1315 (including software (SW)1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-c) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-c may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1305 to perform various functions described herein (e.g., techniques for managing transmissions of reference signals, selecting coverage enhancement techniques, call processing, database management, message routing, etc.). Alternatively, the software 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 600, wireless device 700, wireless device 1000, wireless device 1100, SRS transmission module 610-b, and base station SRS transmission module 1010-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
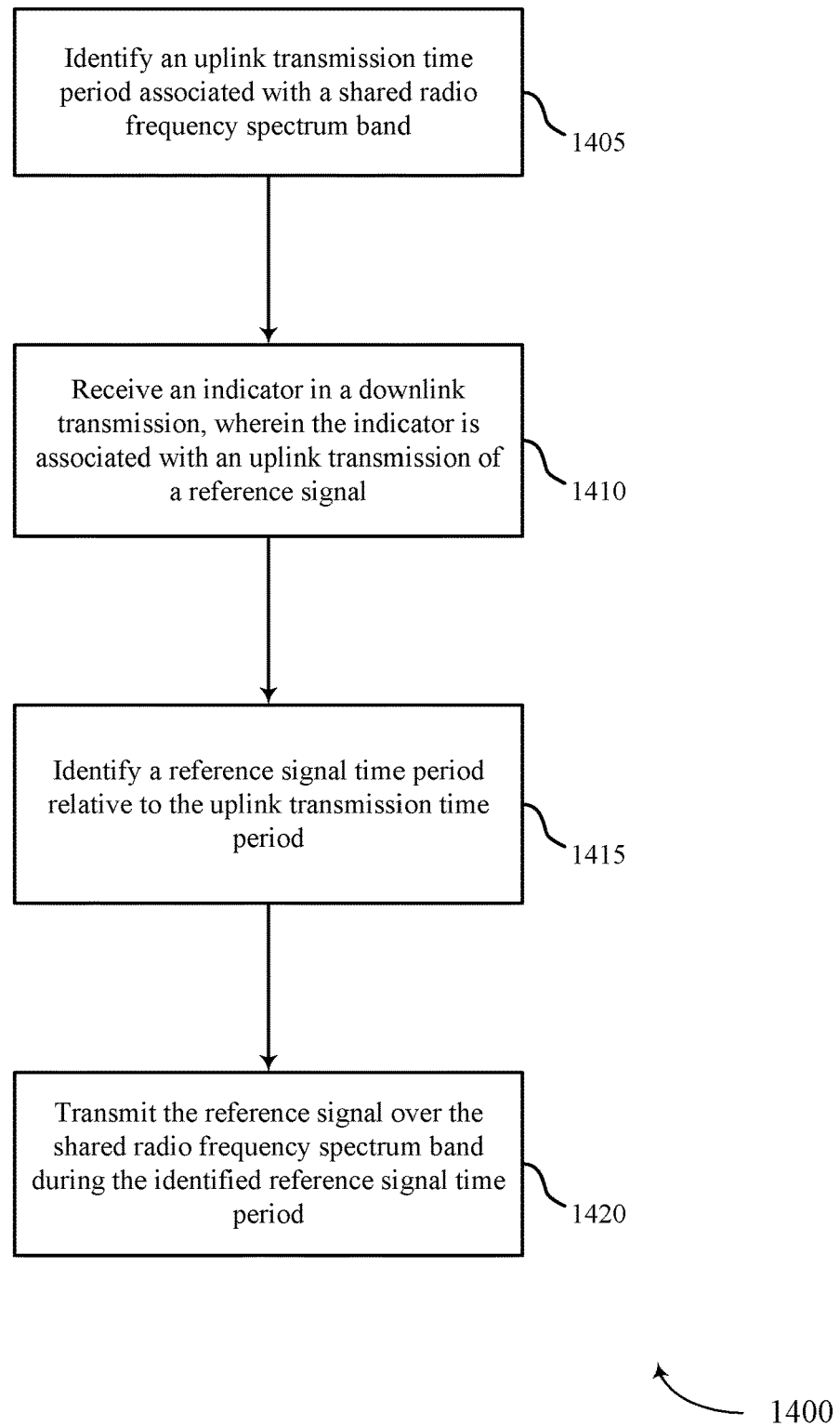
FIGS. 14-22 illustrate methods for the transmission of reference signals over shared spectrum in accordance with various aspects of the present disclosure.

FIG. 14 shows a flowchart illustrating a method 1400 for the transmission of reference signals over shared spectrum in accordance with various aspects of the present disclosure. The operations of method 1400 may be implemented by a UE 115 or its components as described with reference to FIGS. 1-13. For example, the operations of method 1400 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware.

At block 1405, the UE 115 may identify an uplink transmission time period associated with a shared radio frequency spectrum band as described with reference to FIGS. 2-5. In certain examples, the operations of block 1405 may be performed by the uplink identifier 705 as described with reference to FIG. 7.

At block 1410, the UE 115 may receive an indicator in a downlink transmission, the indicator associated with an uplink transmission of a reference signal as described with reference to FIGS. 2-5. In certain examples, the operations of block 1410 may be performed by the indicator identifier 710 as described with reference to FIG. 7.

At block 1415, the UE 115 may identify a reference signal time period relative to the uplink transmission time period as described with reference to FIGS. 2-5. In certain examples, the operations of block 1415 may be performed by the reference signal manager 715 as described with reference to FIG. 7.

At block 1420, the UE 115 may transmit the reference signal over the shared radio frequency spectrum band during the identified reference signal time period as described with reference to FIGS. 2-5. In certain examples, the operations of block 1420 may be performed by the transmitter 615 as described with reference to FIG. 6.

Figure 15:
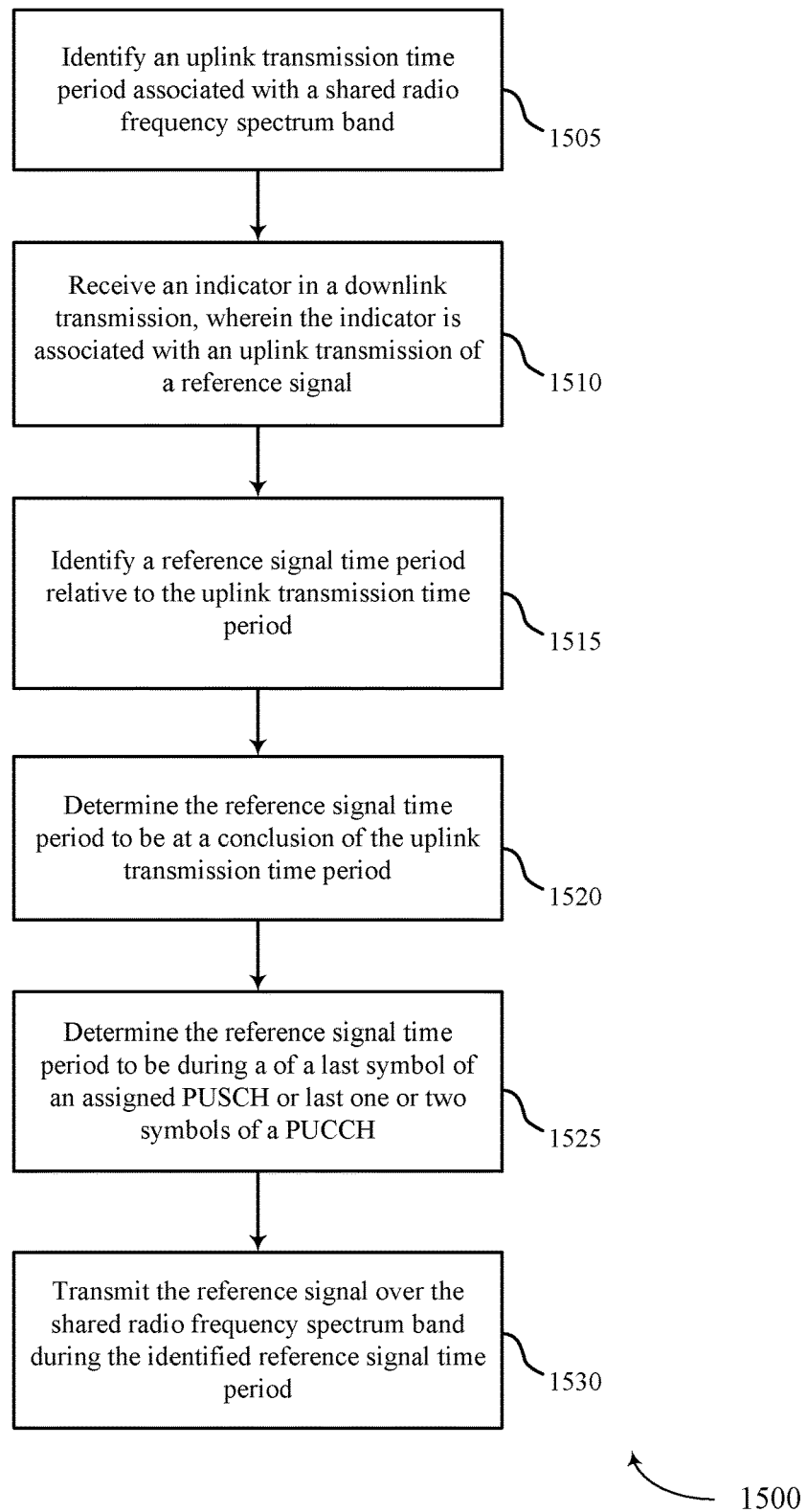

FIG. 15 shows a flowchart illustrating a method 1500 for the transmission of reference signals over shared spectrum in accordance with various aspects of the present disclosure. The operations of method 1500 may be implemented by a UE 115 or its components as described with reference to FIGS. 1-13. For example, the operations of method 1500 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware. The method 1500 may also incorporate aspects of method 1400 of FIG. 14.

At block 1505, the UE 115 may identify an uplink transmission time period associated with a shared radio frequency spectrum band as described with reference to FIGS. 2-5. In certain examples, the operations of block 1505 may be performed by the uplink identifier 705 as described with reference to FIG. 7.

At block 1510, the UE 115 may receive an indicator in a downlink transmission, the indicator associated with an uplink transmission of a reference signal as described with reference to FIGS. 2-5. In certain examples, the operations of block 1510 may be performed by the indicator identifier 710 as described with reference to FIG. 7.

At block 1515, the UE 115 may identify a reference signal time period relative to the uplink transmission time period as described with reference to FIGS. 2-5. In certain examples, the operations of block 1515 may be performed by the reference signal manager 715 as described with reference to FIG. 7.

At block 1520, the UE 115 may determine the reference signal time period to be at a conclusion of the uplink transmission time period as described with reference to FIGS. 2-5. In certain examples, the operations of block 1520 may be performed by the reference signal manager 715 as described with reference to FIG. 7.

At block 1525, the UE 115 may determine the reference signal time period to be during a last symbol of an assigned PUSCH or last one or two symbols of a PUCCH as described with reference to FIGS. 2-5. In certain examples, the operations of block 1525 may be performed by the reference signal manager 715 as described with reference to FIG. 7.

At block 1530, the UE 115 may transmit the reference signal over the shared radio frequency spectrum band during the identified reference signal time period as described with reference to FIGS. 2-5. In certain examples, the operations of block 1530 may be performed by the transmitter 615 as described with reference to FIG. 6.

Figure 16:
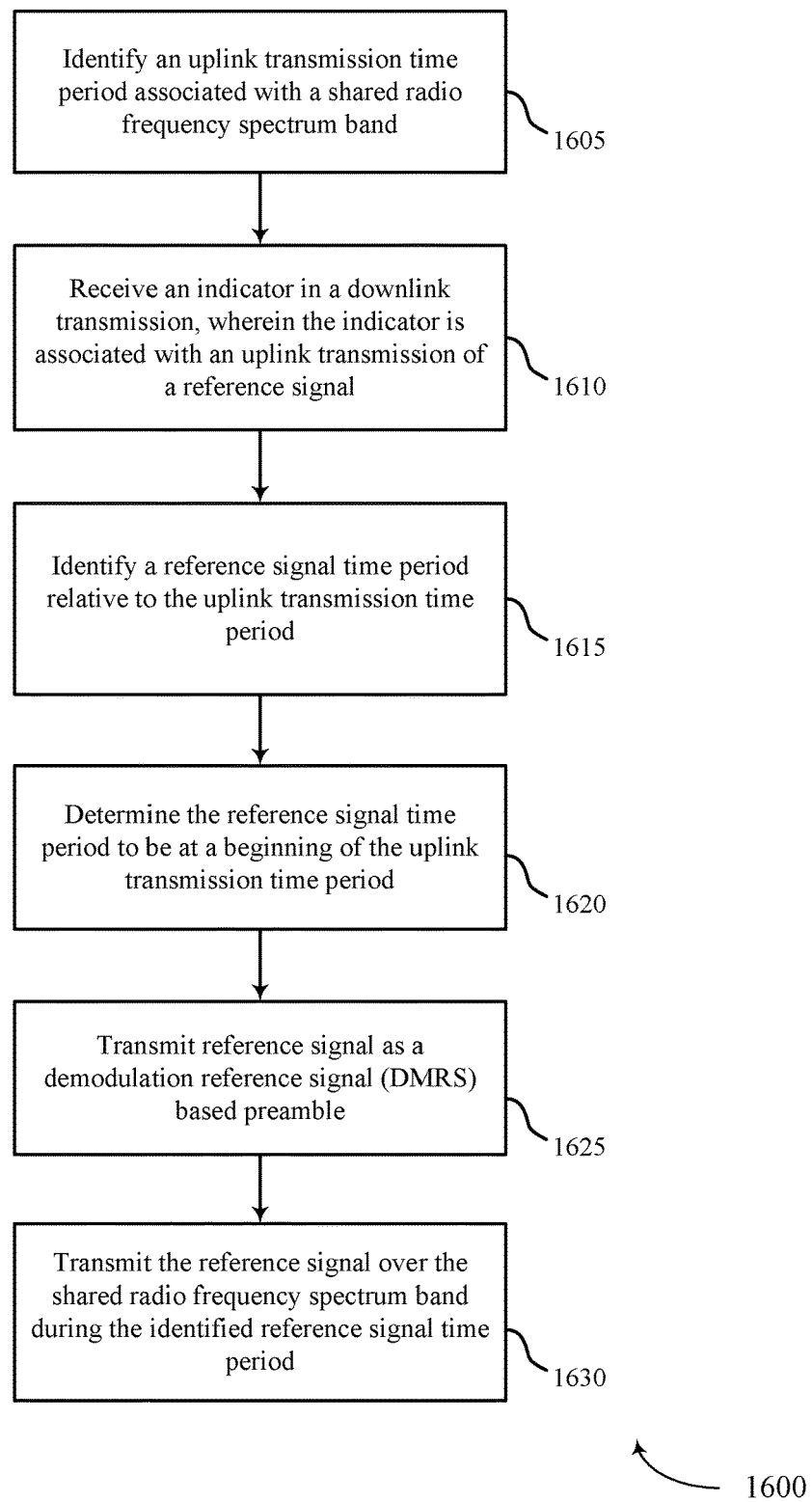

FIG. 16 shows a flowchart illustrating a method 1600 for the transmission of reference signals over shared spectrum in accordance with various aspects of the present disclosure. The operations of method 1600 may be implemented by a UE 115 or its components as described with reference to FIGS. 1-13. For example, the operations of method 1600 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware. The method 1600 may also incorporate aspects of methods 1400 and 1500 of FIGS. 14-15.

At block 1605, the UE 115 may identify an uplink transmission time period associated with a shared radio frequency spectrum band as described with reference to FIGS. 2-5. In certain examples, the operations of block 1605 may be performed by the uplink identifier 705 as described with reference to FIG. 7.

At block 1610, the UE 115 may receive an indicator in a downlink transmission, the indicator associated with an uplink transmission of a reference signal as described with reference to FIGS. 2-5. In certain examples, the operations of block 1610 may be performed by the indicator identifier 710 as described with reference to FIG. 7.

At block 1615, the UE 115 may identify a reference signal time period relative to the uplink transmission time period as described with reference to FIGS. 2-5. In certain examples, the operations of block 1615 may be performed by the reference signal manager 715 as described with reference to FIG. 7.

At block 1620, the UE 115 may determine the reference signal time period to be at a beginning of the uplink transmission time period as described with reference to FIGS. 2-5. In certain examples, the operations of block 1620 may be performed by the reference signal manager 715 as described with reference to FIG. 7.

At block 1625, the UE 115 may transmit reference signal as a DMRS based preamble as described with reference to FIGS. 2-5. In certain examples, the operations of block 1625 may be performed by the transmitter 615 as described with reference to FIG. 6.

At block 1630, the UE 115 may transmit the reference signal over the shared radio frequency spectrum band during the identified reference signal time period as described with reference to FIGS. 2-5. In certain examples, the operations of block 1630 may be performed by the transmitter 615 as described with reference to FIG. 6.

Figure 17:
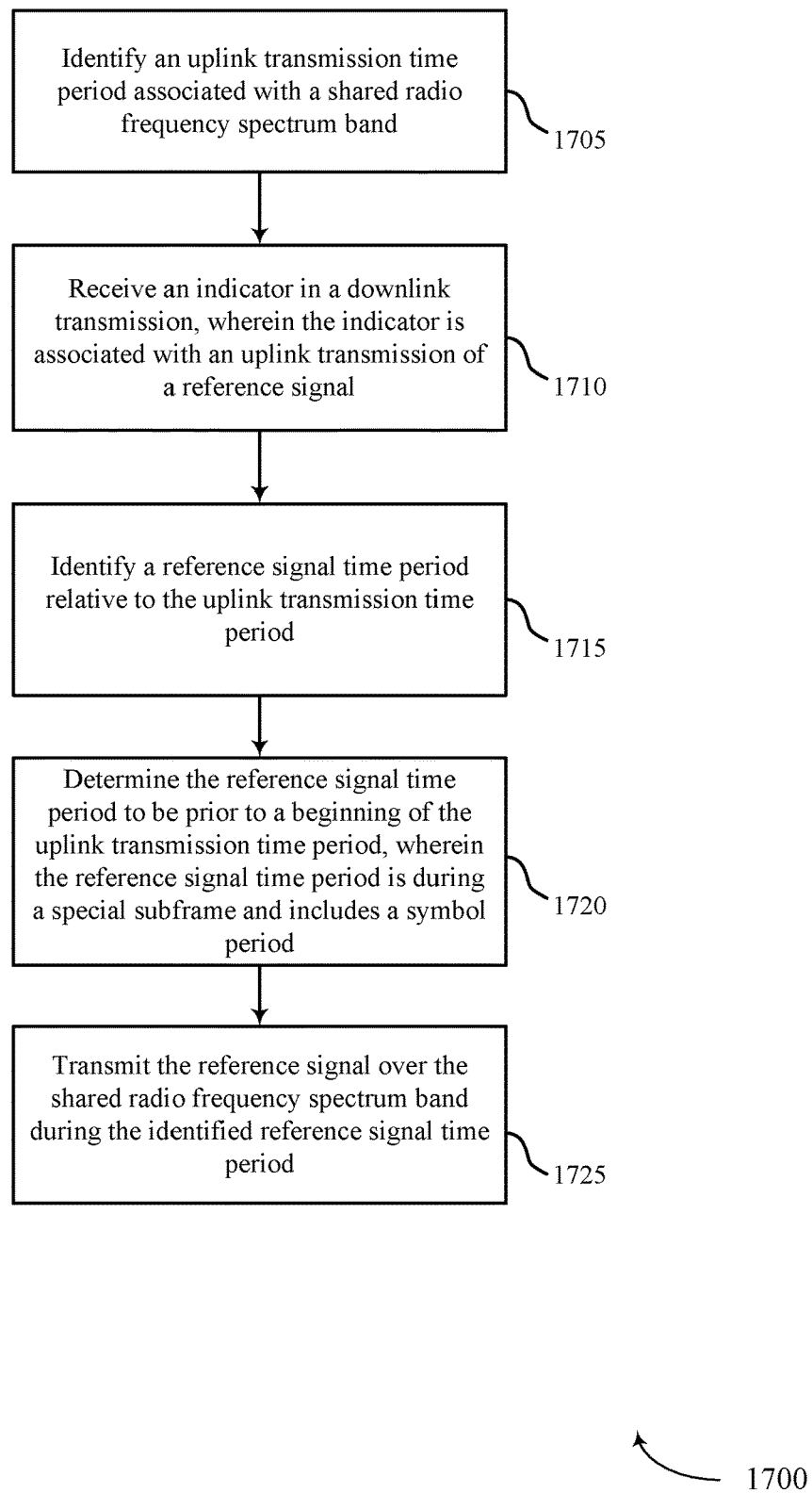

FIG. 17 shows a flowchart illustrating a method 1700 for the transmission of reference signals over shared spectrum in accordance with various aspects of the present disclosure. The operations of method 1700 may be implemented by a UE 115 or its components as described with reference to FIGS. 1-13. For example, the operations of method 1700 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware. The method 1700 may also incorporate aspects of methods 1400, 1500, and 1600 of FIGS. 14-16.

At block 1705, the UE 115 may identify an uplink transmission time period associated with a shared radio frequency spectrum band as described with reference to FIGS. 2-5. In certain examples, the operations of block 1705 may be performed by the uplink identifier 705 as described with reference to FIG. 7.

At block 1710, the UE 115 may receive an indicator in a downlink transmission, the indicator associated with an uplink transmission of a reference signal as described with reference to FIGS. 2-5. In certain examples, the operations of block 1710 may be performed by the indicator identifier 710 as described with reference to FIG. 7.

At block 1715, the UE 115 may identify a reference signal time period relative to the uplink transmission time period as described with reference to FIGS. 2-5. In certain examples, the operations of block 1715 may be performed by the reference signal manager 715 as described with reference to FIG. 7.

At block 1720, the UE 115 may determine the reference signal time period to be prior to a beginning of the uplink transmission time period as described with reference to FIGS. 2-5. In some cases, the reference signal time period is during a special subframe and comprises at least one symbol period. In certain examples, the operations of block 1720 may be performed by the reference signal manager 715 as described with reference to FIG. 7.

At block 1725, the UE 115 may transmit the reference signal over the shared radio frequency spectrum band during the identified reference signal time period as described with reference to FIGS. 2-5. In certain examples, the operations of block 1725 may be performed by the transmitter 615 as described with reference to FIG. 6.

Figure 18:
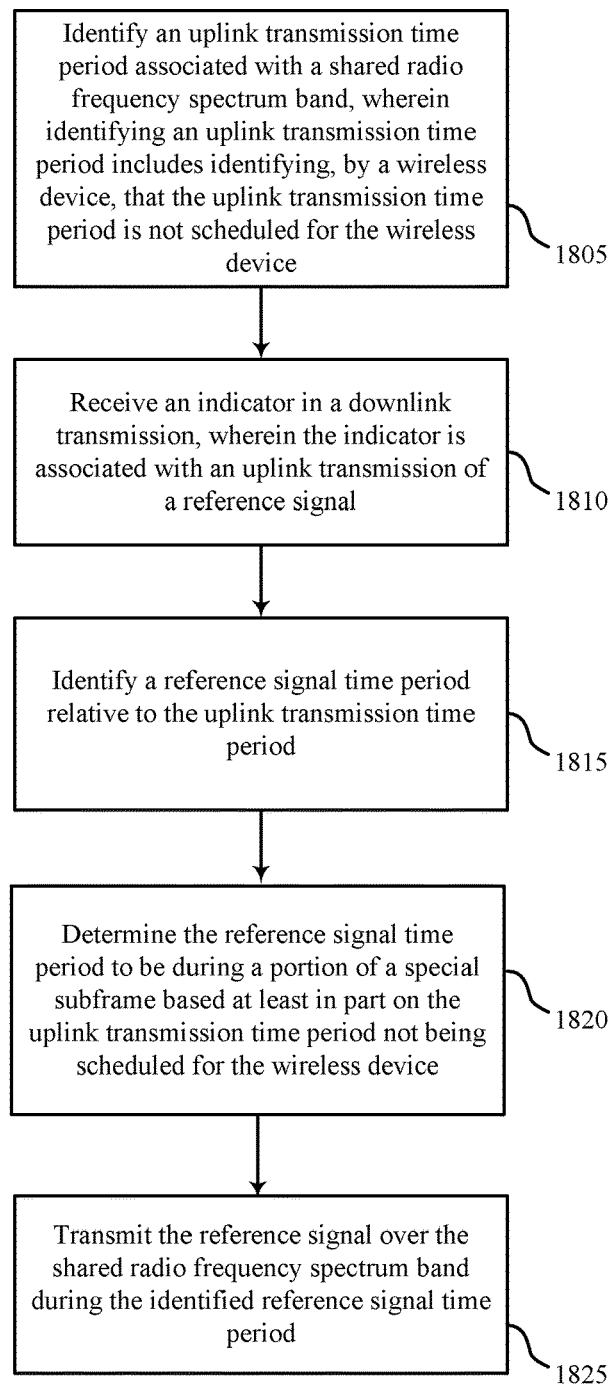

FIG. 18 shows a flowchart illustrating a method 1800 for the transmission of reference signals over shared spectrum in accordance with various aspects of the present disclosure. The operations of method 1800 may be implemented by a UE 115 or its components as described with reference to FIGS. 1-13. For example, the operations of method 1800 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware. The method 1800 may also incorporate aspects of methods 1400, 1500, 1600, and 1700 of FIGS. 14-17.

At block 1805, the UE 115 may identify an uplink transmission time period associated with a shared radio frequency spectrum band as described with reference to FIGS. 2-5. In some cases, the UE 115 may identify that the uplink transmission time period is not scheduled for the UE 115. In certain examples, the operations of block 1805 may be performed by the uplink identifier 705 as described with reference to FIG. 7.

At block 1810, the UE 115 may receive an indicator in a downlink transmission, the indicator associated with an uplink transmission of a reference signal as described with reference to FIGS. 2-5. In certain examples, the operations of block 1810 may be performed by the indicator identifier 710 as described with reference to FIG. 7.

At block 1815, the UE 115 may identify a reference signal time period relative to the uplink transmission time period as described with reference to FIGS. 2-5. In certain examples, the operations of block 1815 may be performed by the reference signal manager 715 as described with reference to FIG. 7.

At block 1820, the UE 115 may determine the reference signal time period to be during a portion of a special subframe based at least in part on the uplink transmission time period not being scheduled for the UE 115 as described with reference to FIGS. 2-5. In certain examples, the operations of block 1820 may be performed by the uplink identifier 705 as described with reference to FIG. 7.

At block 1825, the UE 115 may transmit the reference signal over the shared radio frequency spectrum band during the identified reference signal time period as described with reference to FIGS. 2-5. In certain examples, the operations of block 1825 may be performed by the transmitter 615 as described with reference to FIG. 6.

Figure 19:
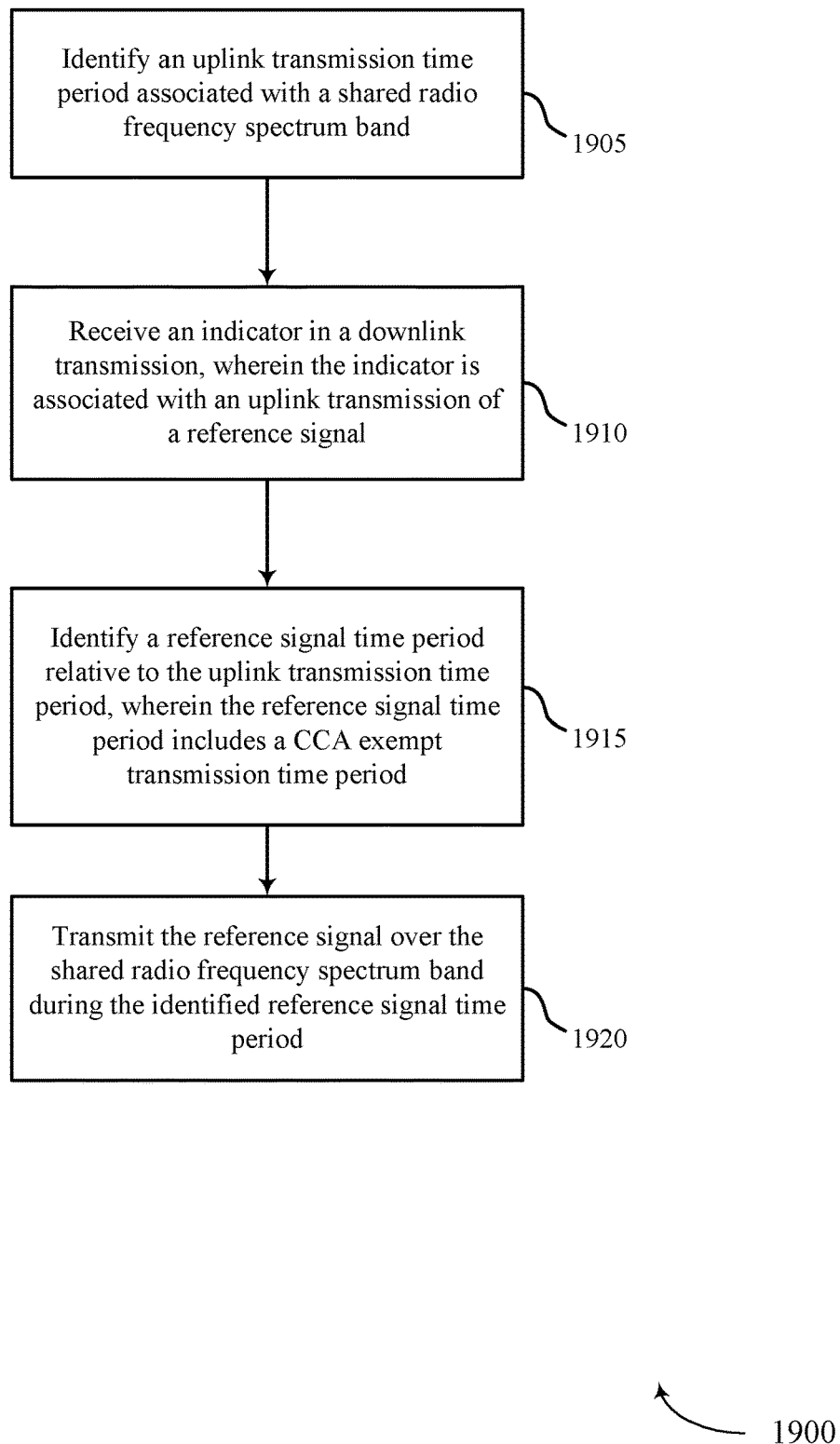

FIG. 19 shows a flowchart illustrating a method 1900 for the transmission of reference signals over shared spectrum in accordance with various aspects of the present disclosure. The operations of method 1900 may be implemented by a UE 115 or its components as described with reference to FIGS. 1-13. For example, the operations of method 1900 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware. The method 1900 may also incorporate aspects of methods 1400, 1500, 1600, 1700, and 1800 of FIGS. 14-18.

At block 1905, the UE 115 may identify an uplink transmission time period associated with a shared radio frequency spectrum band as described with reference to FIGS. 2-5. In certain examples, the operations of block 1905 may be performed by the uplink identifier 705 as described with reference to FIG. 7.

At block 1910, the UE 115 may receive an indicator in a downlink transmission, the indicator associated with an uplink transmission of a reference signal as described with reference to FIGS. 2-5. In certain examples, the operations of block 1910 may be performed by the indicator identifier 710 as described with reference to FIG. 7.

At block 1915, the UE 115 may identify a reference signal time period relative to the uplink transmission time period as described with reference to FIGS. 2-5. In some cases, the reference signal time period comprises a CCA exempt transmission time period. In certain examples, the operations of block 1915 may be performed by the reference signal manager 715 as described with reference to FIG. 7.

At block 1920, the UE 115 may transmit the reference signal over the shared radio frequency spectrum band during the identified reference signal time period as described with reference to FIGS. 2-5. In certain examples, the operations of block 1920 may be performed by the transmitter 615 as described with reference to FIG. 6.

Figure 20:
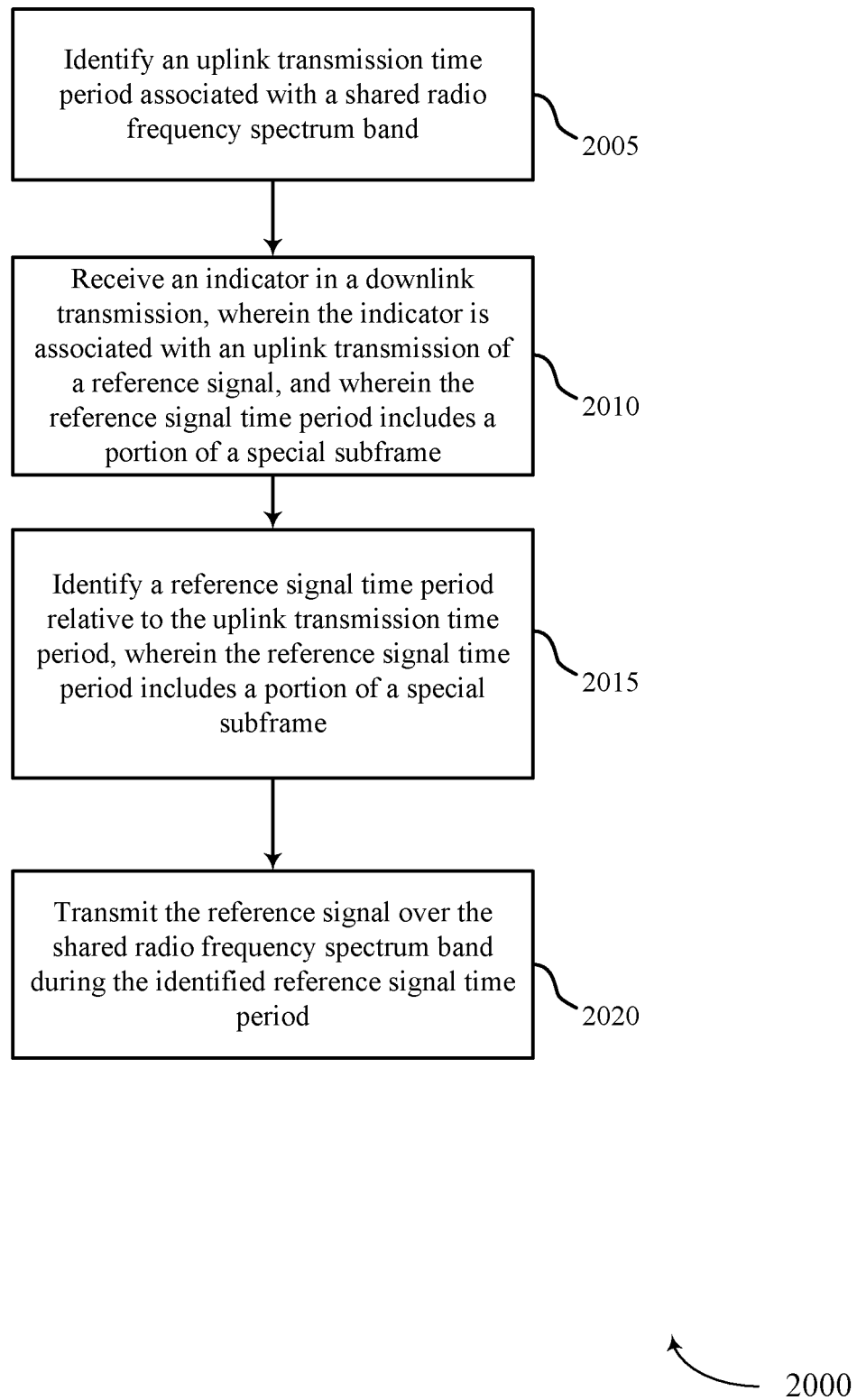

FIG. 20 shows a flowchart illustrating a method 2000 for the transmission of reference signals over shared spectrum in accordance with various aspects of the present disclosure. The operations of method 2000 may be implemented by a UE 115 or its components as described with reference to FIGS. 1-13. For example, the operations of method 2000 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware. The method 2000 may also incorporate aspects of methods 1400, 1500, 1600, 1700, 1800, and 1900 of FIGS. 14-19.

At block 2005, the UE 115 may identify an uplink transmission time period associated with a shared radio frequency spectrum band as described with reference to FIGS. 2-5. In some cases, the indicator comprises a periodicity, or an offset, or a frequency hopping pattern In certain examples, the operations of block 2005 may be performed by the uplink identifier 705 as described with reference to FIG. 7.

At block 2010, the UE 115 may receive an indicator in a downlink transmission, the indicator associated with an uplink transmission of a reference signal as described with reference to FIGS. 2-5. In certain examples, the operations of block 2010 may be performed by the indicator identifier 710 as described with reference to FIG. 7.

At block 2015, the UE 115 may identify a reference signal time period relative to the uplink transmission time period as described with reference to FIGS. 2-5. In some cases, the reference signal time period comprises a portion of a special subframe. In certain examples, the operations of block 2015 may be performed by the reference signal manager 715 as described with reference to FIG. 7.

At block 2020, the UE 115 may transmit the reference signal over the shared radio frequency spectrum band during the identified reference signal time period as described with reference to FIGS. 2-5. In certain examples, the operations of block 2020 may be performed by the transmitter 615 as described with reference to FIG. 6.

Figure 21:
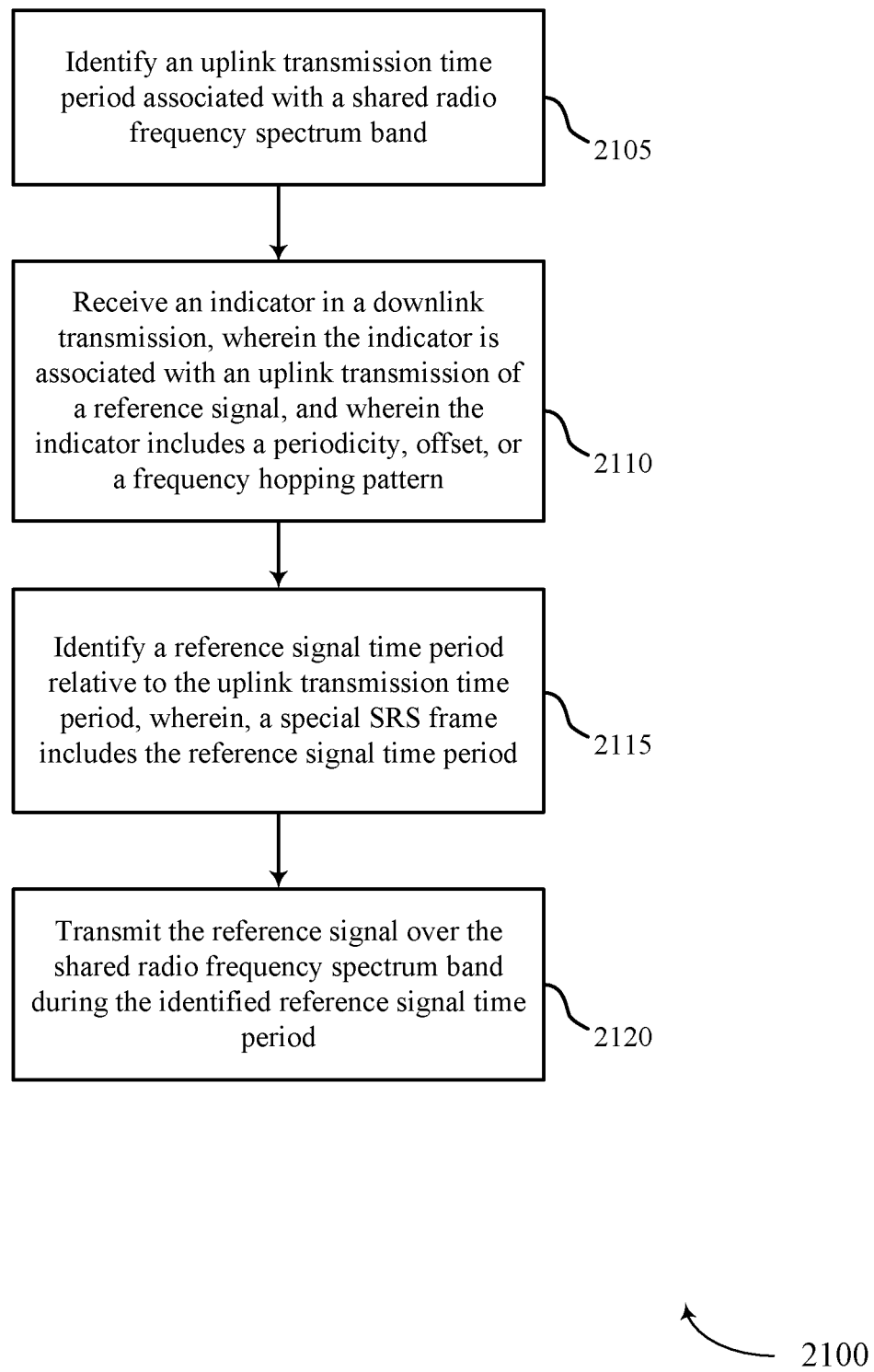

FIG. 21 shows a flowchart illustrating a method 2100 for the transmission of reference signals over shared spectrum in accordance with various aspects of the present disclosure. The operations of method 2100 may be implemented by a UE 115 or its components as described with reference to FIGS. 1-13. For example, the operations of method 2100 may be performed by the SRS transmission module 610 as described with reference to FIGS. 6-9. In some examples, a UE 115 may execute a set of codes to control the functional elements of the UE 115 to perform the functions described below. Additionally or alternatively, the UE 115 may perform aspects of the functions described below using special-purpose hardware. The method 2100 may also incorporate aspects of methods 1400, 1500, 1600, 1700, 1800, 1900, and 2000 of FIGS. 14-20.

At block 2105, the UE 115 may identify an uplink transmission time period associated with a shared radio frequency spectrum band as described with reference to FIGS. 2-5. In certain examples, the operations of block 2105 may be performed by the uplink identifier 705 as described with reference to FIG. 7.

At block 2110, the UE 115 may receive an indicator in a downlink transmission, the indicator associated with an uplink transmission of a reference signal as described with reference to FIGS. 2-5. In some cases, the indicator comprises a periodicity, or an offset, or a frequency hopping pattern. In certain examples, the operations of block 2110 may be performed by the indicator identifier 710 as described with reference to FIG. 7.

At block 2115, the UE 115 may identify a reference signal time period relative to the uplink transmission time period as described with reference to FIGS. 2-5. In some cases, a special SRS frame comprises the reference signal time period. In certain examples, the operations of block 2115 may be performed by the reference signal manager 715 as described with reference to FIG. 7.

At block 2120, the UE 115 may transmit the reference signal over the shared radio frequency spectrum band during the identified reference signal time period as described with reference to FIGS. 2-5. In certain examples, the operations of block 2120 may be performed by the transmitter 615 as described with reference to FIG. 6.

Figure 22:
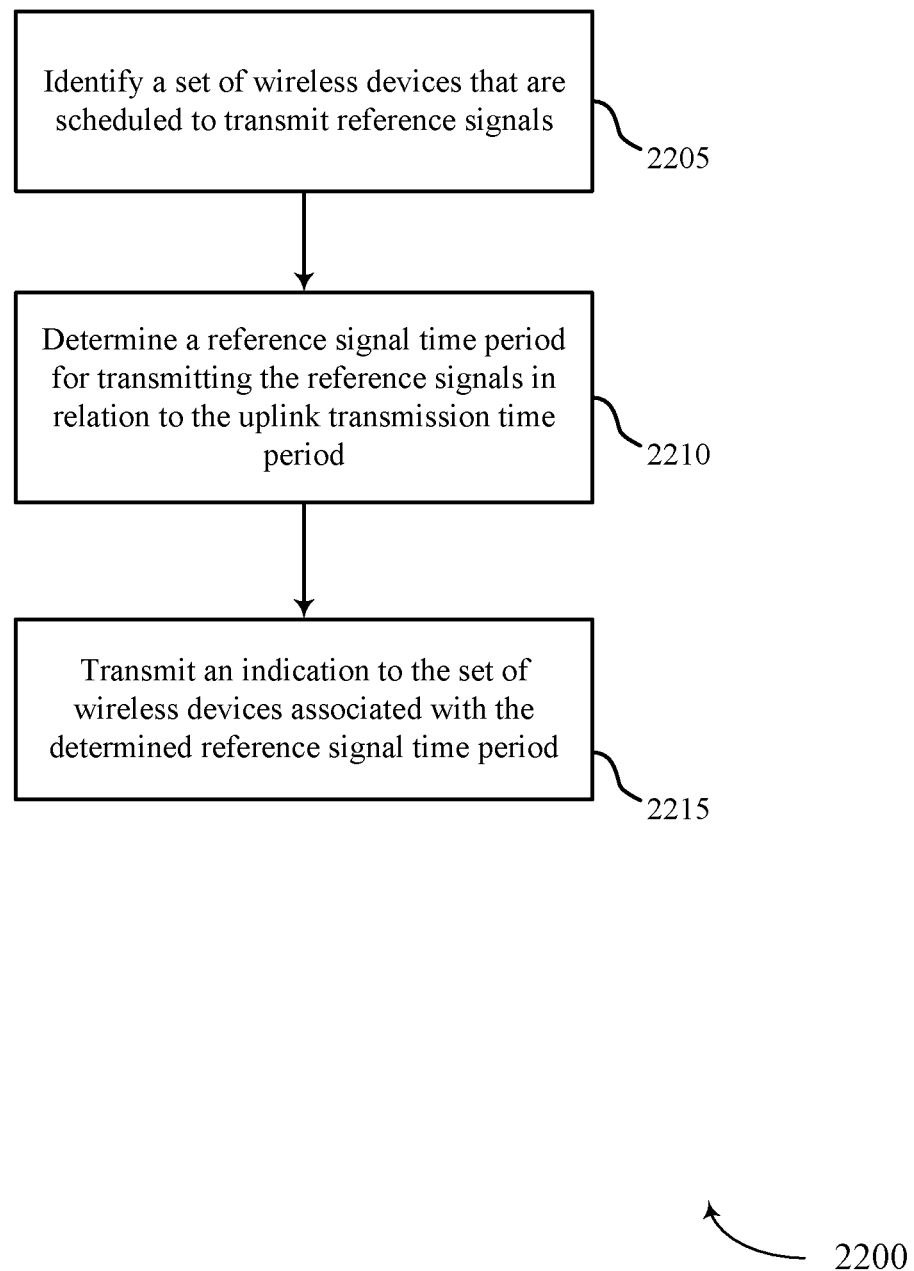

FIG. 22 shows a flowchart illustrating a method 2200 for the transmission of reference signals over shared spectrum in accordance with various aspects of the present disclosure. The operations of method 2200 may be implemented by a base station 105 or its components as described with reference to FIGS. 1-13. For example, the operations of method 2200 may be performed by the base station SRS transmission module 1010 as described with reference to FIGS. 10-13. In some examples, a base station 105 may execute a set of codes to control the functional elements of the base station 105 to perform the functions described below. Additionally or alternatively, the base station 105 may perform aspects of the functions described below using special-purpose hardware. The method 2200 may also incorporate aspects of methods 1400, 1500, 1600, 1700, 1800, 1900, 2000, and 2100 of FIGS. 14-21.

At block 2205, the base station 105 may identify a set of wireless devices that are scheduled to transmit reference signals as described with reference to FIGS. 2-5. In certain examples, the operations of block 2205 may be performed by the reference signal scheduler 1105 as described with reference to FIG. 11.

At block 2210, the base station 105 may determine a reference signal time period for transmitting the reference signals in relation to the uplink transmission time period as described with reference to FIGS. 2-5. In certain examples, the operations of block 2210 may be performed by the BS reference signal manager 1110 as described with reference to FIG. 11.

At block 2215, the base station 105 may transmit an indication to the set of wireless devices associated with the reference signal time as described with reference to FIGS. 2-5. In certain examples, the operations of block 2215 may be performed by the transmitter 1015 as described with reference to FIG. 10.

Thus, methods 1400, 1500, 1600, 1700, 1800, 1900, 2000, 2100, and 2200 may provide for the transmission of reference signals over shared spectrum. It should be noted that methods 1400, 1500, 1600, 1700, 1800, 1900, 2000, 2100, and 2200 describe possible implementation, and that the operations and the steps may be rearranged or otherwise modified such that other implementations are possible. In some examples, aspects from two or more of the methods 1400, 1500, 1600, 1700, 1800, 1900, 2000, 2100, and 2200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. The terms "system" and "network" are often used interchangeably. A code-division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time-division multiple access (TDMA) system may implement a radio technology such as Global System for Mobile Communications (GSM). An orthogonal frequency-division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   identifying an uplink transmission time period associated with a shared radio frequency spectrum band, wherein the uplink transmission time period corresponds to a duration of any of a physical uplink shared channel (PUSCH) transmission, a physical uplink control channel (PUCCH) transmission, a physical random access channel (PRACH) transmission, or a scheduling request (SR) transmission, or any combination thereof;
   receiving an indicator in a downlink transmission associated with an uplink transmission of a reference signal;
   identifying a location of a reference signal time period relative to the uplink transmission time period based at least in part on the indicator; and
   transmitting the reference signal over the shared radio frequency spectrum band during the reference signal time period.

2. The method of claim 1, further comprising:
   determining the location of the reference signal time period to be at a conclusion of the uplink transmission time period based at least in part on the indicator.

3. The method of claim 2, further comprising:
   determining the location of the reference signal time period to be during a last symbol of an assigned PUSCH or last one or two symbols of a PUCCH based at least in part on the indicator.

4. The method of claim 1, further comprising:
   determining the location of the reference signal time period to be at a beginning of the uplink transmission time period based at least in part on the indicator.

5. The method of claim 4, further comprising:
   transmitting the reference signal as a demodulation reference signal (DMRS) based preamble.

6. The method of claim 1, further comprising:
   determining the location of the reference signal time period to be subsequent to a conclusion of the uplink transmission time period based at least in part on the indicator, the reference signal time period comprising at least one symbol.

7. The method of claim 1, further comprising:
   determining the location of the reference signal time period to be prior to a beginning of the uplink transmission time period based at least in part on the indicator.

8. The method of claim 7, further comprising:
   transmitting the reference signal as a channel usage beacon signal (CUBS) preamble.

9. The method of claim 7, wherein the reference signal time period is during a special subframe and comprises at least one symbol.

10. The method of claim 1, further comprising:
    receiving the indicator in a special physical downlink control channel (PDCCH), the special PDCCH indicating a plurality of frequency sub-bands for transmitting the reference signal.

11. The method of claim 1, further comprising:
    receiving the indicator in a special PDCCH, the special PDCCH indicating to a wireless device to transmit the reference signal, wherein the wireless device is not scheduled to transmit during the uplink transmission time period.

12. The method of claim 1, wherein the reference signal time period corresponds to a first uplink subframe associated with the uplink transmission time period.

13. The method of claim 1, wherein
identifying the uplink transmission time period comprises identifying, by a wireless device, that the uplink transmission time period is not scheduled for the wireless device; and
the method further comprising determining the reference signal time period to be during a portion of a special subframe based at least in part on the uplink transmission time period not being scheduled for the wireless device.

14. The method of claim 1, wherein the reference signal time period comprises the uplink transmission time period.

15. The method of claim 1, wherein the reference signal time period comprises a CCA exempt transmission time period.

16. The method of claim 15, wherein the CCA exempt transmission time period comprises at least a portion of an uplink subframe and is periodically scheduled.

17. The method of claim 1, wherein the indicator comprises at least one of a periodicity, an offset, or a frequency hopping pattern.

18. The method of claim 17, wherein the reference signal time period comprises a portion of a special subframe.

19. The method of claim 17, wherein a special sounding reference signal (SRS) frame comprises the reference signal time period.

20. The method of claim 19, wherein the indicator comprises a special SRS frame number associated with the special SRS frame.

21. The method of claim 1, wherein the reference signal time period is scheduled periodically or aperiodically.

22. The method of claim 1, further comprising:
identifying frequency and time resources to transmit the reference signal during the reference signal time period based at least in part on the indicator.

23. The method of claim 1, wherein the indicator is received over one of a PDCCH or a PFFICH.

24. An apparatus for wireless communication, comprising:
a processor;
memory in electronic communication with the processor; and
instructions stored in the memory and operable, when executed by the processor, to cause the apparatus to:
identify an uplink transmission time period associated with a shared radio frequency spectrum band, wherein the uplink transmission time period corresponds to a duration of any of a physical uplink shared channel (PUSCH) transmission, a physical uplink control channel (PUCCH) transmission, a physical random access channel (PRACH) transmission, or a scheduling request (SR) transmission, or any combination thereof;
receive an indicator in a downlink transmission associated with an uplink transmission of a reference signal;
identify a location of a reference signal time period relative to the uplink transmission time period based at least in part on the indicator; and
transmit the reference signal over the shared radio frequency spectrum band during the reference signal time period.

25. The apparatus of claim 24, wherein the instructions are operable to cause to:
determine the location of the reference signal time period to be at a conclusion of the uplink transmission time period based at least in part on the indicator.

26. The apparatus of claim 24, wherein the instructions are operable to cause to:
determine the location of the reference signal time period to be at a beginning of the uplink transmission time period based at least in part on the indicator.

27. The apparatus of claim 24, wherein the instructions are operable to cause to:
determine the location of the reference signal time period to be subsequent to a conclusion of the uplink transmission time period based at least in part on the indicator, the reference signal time period comprising at least one symbol.

28. The apparatus of claim 24, wherein a special sounding reference signal (SRS) frame comprises the reference signal time period.

29. An apparatus for wireless communication, comprising:
means for identifying an uplink transmission time period associated with a shared radio frequency spectrum band, wherein the uplink transmission time period corresponds to a duration of any of a physical uplink shared channel (PUSCH) transmission, a physical uplink control channel (PUCCH) transmission, a physical random access channel (PRACH) transmission, or a scheduling request (SR) transmission, or any combination thereof;
means for receiving an indicator in a downlink transmission associated with an uplink transmission of a reference signal;
means for identifying a location of a reference signal time period relative to the uplink transmission time period based at least in part on the indicator; and
means for transmitting the reference signal over the shared radio frequency spectrum band during the reference signal time period.

30. A non-transitory computer-readable medium storing code for wireless communication, the code comprising instructions executable to:
identify an uplink transmission time period associated with a shared radio frequency spectrum band, wherein the uplink transmission time period corresponds to a duration of any of a physical uplink shared channel (PUSCH) transmission, a physical uplink control channel (PUCCH) transmission, a physical random access channel (PRACH) transmission, or a scheduling request (SR) transmission, or any combination thereof;
receive an indicator in a downlink transmission associated with an uplink transmission of a reference signal;
identify a location of a reference signal time period relative to the uplink transmission time period based at least in part on the indicator; and
transmit the reference signal over the shared radio frequency spectrum band during the reference signal time period.

* * * * *